United States Patent [19]

Olnowich et al.

[11] Patent Number: 5,542,048
[45] Date of Patent: Jul. 30, 1996

[54] INCREASING PROBABILITY MULTI-STAGE NETWORK

[75] Inventors: Howard T. Olnowich, Endwell, N.Y.; Jehoshua Bruck, Palo Alto, Calif.; James W. Feeney, Endicott, N.Y.; Eli Upfal, Palo Alto, Calif.

[73] Assignee: International Business Machines Corporation, Armonk, N.Y.

[21] Appl. No.: 946,514

[22] Filed: Sep. 17, 1992

[51] Int. Cl.[6] ................................. H01J 13/00
[52] U.S. Cl. .................. 395/200.15; 340/825.8; 364/238.1; 364/242.94; 364/DIG. 1; 370/54
[58] Field of Search ....................... 395/275, 200, 395/200.15; 340/825.8; 370/54; 364/238.1, 242.94, DIG. 1

[56] References Cited

U.S. PATENT DOCUMENTS 4,965,788  10/1990  Newman ............................ 370/60
4,984,237   1/1991  Franaszek ........................... 370/60
5,231,631   7/1993  Buhrke et al. ....................... 370/60

OTHER PUBLICATIONS

IBM TDB vol. 33, No. 5, Oct., 1980, "Asynchronous Digital Video Switching System", by Farrell et al, pp. 227–233.

Primary Examiner—Alyssa H. Bowler
Assistant Examiner—John Harrity
Attorney, Agent, or Firm—Shelley M. Beckstrand; Jenkens & Gilchrist, P.C.

[57] ABSTRACT

A multi-stage circuit switched network for improving connection establishment using intelligent switching devices. As a transmission makes its way through the network stages, the probability of connecting to a destination increases, i.e., the chance of encountering a blocked device output is decreased. This is opposite of most traditional networks, whose probability for success diminishes with every stage in the connection sequence.

4 Claims, 18 Drawing Sheets

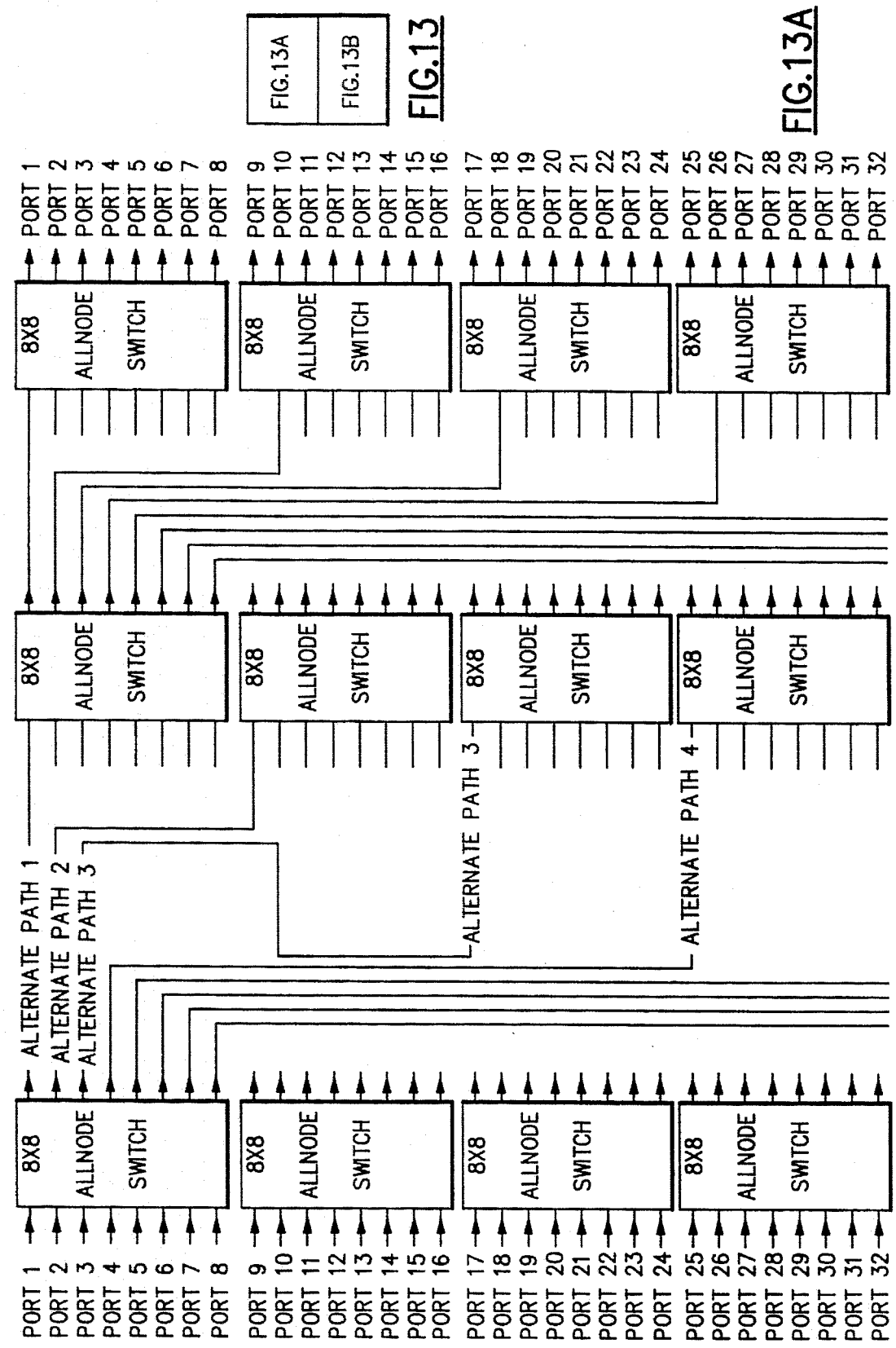

INCREASING PROBABILITY MULTI-STAGE NETWORK

RELATED APPLICATIONS

The present U.S. patent application claims priority as a continuation-in-part application and is related to the following applications:

U.S. Ser. No. 07/677,543, filed Mar. 29, 1991, entitled "All-Node Switch, An Unclocked, Unbuffered Asynchronous Switching Apparatus", by P. A. Franaszek et al., and continued as U.S. Ser. No. 08/457,789 filed Jun. 2, 1995

U.S. Ser. No. 07/799,497, Filed Nov. 27, 1991, entitled "Multi-Function Network" by H. T. Olnowich, et al., and continued as U.S. Ser. No. 08/216,789 filed Mar. 23, 1994, and continued as U.S. Ser. No. 08/606,232 filed Feb. 23, 1996

U.S. Ser. No. 07/799,498, Filed Nov. 27, 1991, entitled "Dual Priority Switching Apparatus for Simplex Networks" by H. T. Olnowich et al., U.S. Ser. No. 07/799,602, Filed Nov. 27, 1991, entitled "Multi-Media Serial Line Switching Adapter for Parallel Networks and Heterogenous and Homologous Computer Systems", by H. T. Olnowich, et al. continued as (1) U.S. Ser. No. 08/390,893 filed Feb. 15, 1995, now U.S. Pat. No. 5,535,373; and (2) U.S. Ser. No. 08/178,957 continued as U.S. Ser. No. 08/521,774 filed Aug. 31, 1995

The present application is also related to the following applications filed concurrently herewith:

U.S. Ser. No. 07/947,196, filed Sep. 17, 1992, entitled "Multi-Media Analog/Digital/Optical Switching Apparatus", by H. T. Olnowich et al, and, issued Jan. 24, 1995 as U.S. Pat. No. 5,384,773, and, U.S. Ser. No. 07/946,204, filed Sep. 17, 1992, entitled "Switch-Based MicroChannel Planar Apparatus" by H. T. Olnowich et al, and, issued Feb. 27, 1996 as U.S. Pat. No. 5,495,474, and, U.S. Ser. No. 07/946,512, filed Sep. 17, 1992, entitled "Switch-Based Personal Computer Interconnection Apparatus" by H. T. Olnowich et al, and, continued as U.S. Ser. No. 08/316,620 filed Sep. 30, 1994 and abandoned Feb. 6, 1996, and, U.S. Ser. No. 07/947,644, filed Sep. 17, 1992, entitled "Slave MicroChannel Apparatus for Converting to Switch Architecture" by H. T. Olnowich et al, and, continued as U.S. Ser. No. 08/286,107 filed Aug. 4, 1994, and Notice of Appeal filed Feb. 23, 1996 and U.S. Ser. No. 07/946,506, filed Sep. 17, 1992, entitled "Master MicroChannel Apparatus for Converting to Switch Architecture" by H. T. Olnowich et al, and, continued as U.S. Ser. No. 08/381,669 filed Jan. 30, 1995 and, U.S. Ser. No. 07/946,513, filed Sep. 17, 1992, entitled "Variable Cyclic Redundancy Coding Method and Apparatus" by H. T. Olnowich et al, and, now appealed and, U.S. Ser. No. 07/947,010, filed Sep. 17, 1992, entitled "Signal Regeneration Apparatus for Multi-Stage Transmissions", by H. T. Olnowich et al, and, now appealed and, U.S. Ser. No. 07/947,023, filed Sep. 17, 1992, now issued as U.S. Pat. No. 5,345,229, issued Sep. 6, 1994 as U.S. Pat. No. 5,345,229, entitled "Adaptive Switching Apparatus for Multi-Stage Networks", by H. T. Olnowich et al, and, U.S. Ser. No. 07/946,986, filed Sep. 17, 1992, entitled "Priority Interrupt Switching Apparatus for Real Time Systems", by H. T. Olnowich et al, and issued Apr. 4, 1995 as U.S. Pat. No. 5,404,537 and, U.S. Ser. No. 07/946,509, filed Sep. 17, 1992, entitled "Message Header Generation Apparatus for Parallel Systems" inventors H. T. Olnowich et al.

These applications and the present application are owned by one and the same assignee, International Business Machines Corporation of Armonk, N.Y.

The descriptions set forth in the previous applications and the concurrently filed applications are incorporated by reference. These applications and the present application are owned by one and the same assignee, namely, International Business Machines Corporation of Armonk, N.Y.

FIELD OF THE INVENTIONS

The present invention relates to digital computer systems comprised of several or many computing and/or input/output elements, and the ability of the said individual elements to perform high speed, low-latency communications with each other in a parallel fashion over a multi-stage, switching interconnection network.

The present invention further relates to mutli-stage, circuit-switched networks without central clocking, and the ability to transfer digital data over the network quickly and accurately.

GLOSSARY OF TERMS

Adaptive
  The ability of each switching element to determine for itself which of several optional alternate paths to try at each stage of the network based on availability.
Alternate Path
  One of a plurality of connection paths that can be used to from a connection between a sending node and a receiving node through a multi-stage network.
Blocking
  The characteristics of multi-stage networks which sometimes prevent a sending node from establishing a connection to an available receiving node due to the properties of the network.
Circuit-switched network
  A network where the individual switching elements comprising the network do not buffer the data messages, but pass them immediately as a direct connection from input to output.
Data Message
  A format for sending information between nodes of a parallel system incorporating the further ability to check the said information for accuracy using cyclic redundancy coding methods.
Data
  Another term for Data Message
Idle
  The state of a switch interface where it is not presently involved in the process of connecting two nodes.
Message
  Another term for Data Message
Node
  A functional element of the system comprised of one or more processors or input/output devices interconnected by a network.
Nodal element
  Another term for node, which has the same meaning.
NRZ
  Abbreviation for non-return to zero.

Port
   A single bi-directional entry and exit point to a switching netwrok.
Receiving Node
   A functional element which is receiving data transmitted over a network.
Sending Node
   A functional element which is transmitting data over a network.

BACKGROUND OF THE INVENTIONS

Parallel computing systems consist of a plurality of processors that communicate via an interconnection network. One popular network for providing the interconnection for a plurality of processors is the circuit-switched network comprised of multiple circuit switches. The state-of-the-art unbuffered circuit switch is the ALLNODE Switch (Asynchronous, Low Latency, inter-NODE switch), which is disclosed in U.S. Ser. No. 07/677,543 and continued as U.S. Ser. No. 08/457,789 filed Jun. 2, 1995. The Allnode switch as disclosed in U.S. Ser. No. 07/677,543 (now continued as U.S. Ser. No. 08/457,789) provides excellent low latency characteristics because it implements a minimum amount of circuitry at each switch stage of a multi-stage interconnection network. The latency across the switch is extremely fast because the equivalent of a straight wire connection is provided across each switch stage. The Allnode Switch supports a totally asynchronous transmission that does not require relatching or buffering at the individual switch elements. Therefore, the Allnode Switch delivers data messages being transmitted through the switch as quickly as possible avoiding the delays of any buffering.

As the field of parallel processing advances, the need for better preforming interconnection networks comprised of multiple stages becomes of prime importance. To date, one of the highest performing circuit switch networks has been described in U.S. Ser. No. 07/799,497, Filed Nov. 27, 1991 and continued as U.S. Ser. No. 08/216,789 filed Mar. 23, 1994, and continued as U.S. Ser. No. 08/606,232 filed Feb. 23, 1996, "Multi-Function Network" by H. T. Olnowich et al. The said network uses multiple paths through the network, called alternate paths, and searches for an open path to make a network connection. The said network uses the "Dual Priority Switching Apparatus for Simplex Networks" described by H. T. Olnowich et al. in U.S. Ser. No. 07/799, 262 and continued as U.S. Ser. No. 08/318,578 filed Oct. 5, 1994, which is a two mode switch capable of performing two different switching modes based on the presence of different types of traffic patterns in the network. The first mode causes connections in the network to be broken if "cold" or random traffic encounters blockage in the network, and then path establishment is retried over a different alternate path in the network as controlled by the node trying to establish the connection. The second mode causes traffic into the network which has been classified as "hot" traffic to experience a different network capability of camp-on (previously won connections in the network are not broken when hot spot congestion is experienced in the network). In the camp-on mode, the request for a connection is placed into a priority queue at the switch experiencing blockage and serviced as soon as the blockage dissapates on a fairness basis to prevent the starvation of any node encountering a hot spot.

The existing methods have some disadvantages. The alternate paths are chosen randomly and blindly by the sending nodes and their network adapters before entering the network. This approach leads to choosing a fixed path to be tried. If the fixed path is blocked for random traffic, the network adapter picks another path blindly and tries again to establish connection. The blind selection problem is solved by the co-pending application, U.S. Ser. No. 07/947,023 now issued as U.S. Pat. No. 5,345,229, "Adaptive Switching Apparatus" by H. T. Olnowich etal. The adaptive switch permits each switching element to determine for itself which of several optional alternate paths to try at each stage of the network based on availability. This is a better approach because it brings the decision directly to the switching apparatus involved, which has the data required to make an intelligent decision, as opposed to being commanded blindly from a distance.

A further problem exists in multi-stage networks, especially in circuit switched multi-stage networks, where a path must be won simultaneously at every stage through the entire network. This is necessary in order to establish a direct circuit connection through the network for sending a data message from a sending node to a receiving node. In traditional circuit switched networks experiencing heavy loading, it becomes difficult to win resources across the entire network. In IBM DOCUMENT NO. AAA92A000597, "Experimental Comparison of Multistage Interconnection Networks", published in November 1991 by S. Konstantinidou and E. Upfal extensive simulation results comparing the routing performance of various multistage communication networks. These simulations of traditional networks have shown that such networks tend to clog at about a 20% loading factor. The clogging has been shown to occur mainly at the later stages of the network.

The clogging at later stages presents a problem because this is the worst place for networks to clog. As a transfer starts into the network, it must win each network stage in succession. It wins the first stage and then tries to win the second stage while holding and tying up the resources at the first stage. After winning the second stage, it tries to win the third stage while tying up the resources at the first and second stages. Thus, the establishment of a connection works its way through the network forming a path to the desired receiving node. If other connections want to use a resource being held, they cannot and this effect adds to the clogging of the network. As the path being established works its way deeper into the network, it ties up more resources, and causes more clogging. Worse yet, if the path progresses to a later network stage and finds that it is blocked there, the attempt is classified as unsuccessful and the whole path is torn down and another path is tried. The result being that all of the resources being tied up by the unsuccessful attempt, caused clogging to no avail. The whole effort was not only wasted but it caused additional clogging. The additional clogging is proportional to the time that the resources are tied up in relation to an unsuccessful attempt. The further into the network that the blocking is encountered, the more clogging it generates. Thus, the problem is that existing networks with equal or higher blocking characteristics in the later stages provide just the opposite effect of what is needed for better performance. What is needed is a network with an increasing probability of success in the later stages.

If blocking in the network is to occur, it would be better to have it occur in the early stages. Then a path could start to be established, encounter immediately its highest blocking probabilities, and back off quickly if it encounters blocking. This way resources that cannot be used are not reserved for very long.

Other interesting work towards solving the blocking problem is reported in IBM DOCUMENT NO. AAA91A005191, "The Multibutterfly Communication Scheme", published in the "Proceedings of the IBM Interdivisional Parallel Processing Symposium" by S. Konstantinidou and E. Upfal, held in Gaithersburg, Md. on August 1991, p93. Eulal et al. present a novel communication scheme, based on an original network topology. The Multibutterfly network is sparse, symmetric and scalable. Its topology combines the useful properties of the Butterfly network, commonly used today in parallel computers, with the high connectivity property of a special type of sparse expander graphs. The Multibutterfly communication scheme uses a simple deterministic routing algorithm. The routing algorithm requires only small buffers is each node, and it is easy to implement. The present invention builds on the multibutterfly concept by introducing the use of a new switching element, changing the routing algorithm, and eliminating the buffers to provide an even better network.

Often systems require multiple paths through the switching networks to perform different functions. An earlier work at IBM by Peter Franaszek, as described in his work entitled "Multipath Hierarchies in Interconnection Networks" described two hierarchical paths for a network, one providing low-latency message transfer and the other providing guaranteed-delivery of a message transfer and the other providing guaranteed-delivery of a message at a longer latency. A message is attempted over the low-latency path first. If the transmission fails due to blocking or contention, it is retransmitted over the guaranteed-delivery path. This allows usually about 90% of the messages to be sent successfully over the low-latency path, and guarantees the delivery of a message that gets blocked on the low-latency path due to retransmissions.

U.S. Pat. No. 4,952,930 to P. A. Franaszek et al. issued Aug. 28, 1990 described the approach which used a second buffered path, which is in some ways similar to the current approach. However, it suffered by its requirements of a plurality of switches to implement it. While there would be no impediment to our adopting the teachings of this patent there remained a need for a simpler and yet more flexible approach to create a multi-stage network.

Multi-stage networks have become an accepted means for interconnecting multiple devices within a computer system. They are a replacement for the traditional crossbar interconnection. The crossbar is still a most efficient method of network interconnection, but it tends to be impractical for large systems. An N×M crossbar permits total simultaneous interconnection, where all the N devices can be communicating simultaneously with different members of the set of M devices. The crossbar is "non-blocking" because their is nothing internal to the crossbar which prevents any given N device from connecting to an M device which is IDLE (is not connected to some other N device). If an N device desires to connect to an M device which is BUSY (previously connected to some other N device), no connection can be made until the previous connection is broken—however, this is referred to as "contention" and is not called "blocking".

When N and M become large (usually greater than 32 or 64) it becomes very unwieldy to build crossbars since there complexity increases at an N×M rate and their pin count increases at an (N×M)×W rate, where W=the number of pins per port. Thus large networks are usually built from multi-stage networks constructed by cascading several stages of smaller crossbars together to provide an expanded network. The disadvantage of multi-stage networks is that they are "blocking", i.e., a connection might not be able to be made to an IDLE M device because there is no path available in the network to provide the necessary connection to the IDLE device.

Among other patents which might be reviewed are: U.S. Pat. No. 4,914,571 to A. E. Baratz et al. issued Apr. 3, 1990 which describes a method of addressing and thus how to find resources attached to a network, but does not deal with the hardware for the actual network itself.

U.S. Pat. No. 4,455,605 to R. L. Cormier et al. issued Jun. 19, 1984 which is for a bus oriented system, it is not a multi-stage network. Similarly, U.S. Pat. No. 4,396,984 to E. R. Videki, II issued Aug. 2, 1983 is for an I/O bus channel, not a multi-stage network. U.S. Pat. No. 4,570,261 to J. W. Maher issued Feb. 11, 1986 is for fault recovery over a bus oriented system, not a multi-stage network.

U.S. Pat. No. 4,207,609 to F. A. Luiz et al. issued Jun. 10, 1980 illustrates an I/O bus channel so that those in the art will understand the differences between the subject matter. It is not a multi-stage network.

U.S. Pat. No. 4,873,517 to A. E. Baratz et al. issued Oct. 10, 1989 is for a totally different type of network, not an equi-distant multi-stage network like that which we will describe, and also, U.S. Pat. No. 4,932,021 to T. S. Moody issued Jun. 5, 1990 for bus wiring paths inside a computer box, it is not a multi-stage network. U.S. Pat. No. 4,733,391 to R. J. Godbold et al. issued Mar. 22, 1988 illustrates a ring interconnection network, which is unlike a multi-stage network. U.S. Pat. No. 4,811,201 to B. R. Rau et al. issued Mar. 7, 1989 are not applicable to a multi-stage network. U.S. Pat. No. 4,754,395 to B. P Weisshaar et al. issued Jun. 28, 1988 is for a ring interconnection network.

The present invention is a modification and adaption of the multibutterfly network as disclosed in IBM DOCUMENT NO. AAA91A005191, which uses the circuit-switch disclosed in the co-pending application, U.S. Ser. No. 07/947,023 now issued as U.S. Pat. No. 5,345,229, "Adaptive Switching Apparatus" by H. T. Olnowich etal. The adaptive switch is an improvement of the Allnode switch concept as disclosed the parent application, U.S. Ser. No. 07/677,543 continued as U.S. Ser. No. 08/457,789 filed Jun. 2, 1995. We have solved some of the problems encountered in the prior art and will describe a way whereby some of the traditional blocking problems in multi-stage networks are circumvented.

SUMMARY OF THE INVENTION

The invention is a switch-based network interconnection method comprised of intelligent switching apparatus devices for improving the performance and connection establishing capability of multi-stage switching networks. The invention method is particularly effective in asynchronous circuit-switched networks. The most important feature of the invention methodology is the an increasing probability for the success of making a connection through all the stages of a multi-satge network. As a connection progresses through a multi-stage network, it must win successive stages of the network, one at a time, until it has made its way from on side of the network to the other and established the commanded source-to-destination connection. The uniqueness in the present invention is that as the connection at each stage of the network is established, looking forward to the next stage, the probability will be greater of establishing the next connection without encountering blocking than it was for the present stage. This presents an ever increasing probability for establishing a successful connection as a path works its way through the network. This is opposite of most traditional networks, whose probabiltiy for success diminishes with every stage in the connection sequence.

The invention is especially applicable to circuit switched multi-stage networks, because they have a simiultaneity problem of having to win every stage through the entire network in order to establish a connection path. This is because a circuit-switch establishs a direct circuit connection through the network for sending a data message from a sending node to a receiving node. In traditional circuit switched networks experiencing heavy loading, it becomes difficult to win resources across the entire network. The clogging has been shown to occur mainly at the later stages of the network, which yields a decreasing probability for success.

The invention makes use of intelligent switching apparatus devices to aid in the increasing probability process. The switching device used is disclosed by the co-pending application, U.S. Ser. No. 07/947,023 now issued as U.S. Pat. No. 5,345,229, "Adaptive Switching Apparatus" by H. T. Olnowich etal. The adaptive switch permits each switching element to determine for itself which of several optional alternate paths to try at each stage of the network based on availability. This is a better approach because it brings the decision directly to the switching apparatus involved, which has the data required to make an intelligent decision.

The adaptive switching appartus is a modification of the high speed and low latency switch interconnection techniques disclosed in the parent application, the ALLNODE Switch (Asynchronous, Low Latency, inter-NODE switch), which is disclosed in U.S. Ser. No. 07/677,543 continued as U.S. Ser. No. 08/457,789 filed Jun. 2, 1995. The parent Allnode Switching apparatus provides a switching network communication structure that has the characteristic of simplicity of implementation, and does not require data buffering or data conversion of any kind. It establishes or breaks connections instantaneously and is, therefore, dynamically changeable with a very quick response time. It has the capability of resolving requests to establish connections in a parallel manner, where n connections can be established or broken at the same time (where n=the number of elements of the system which are communicating via the switching network). Thus, the number of connections that can be made or broken simultaneously scales directly with the size of the system. This capability enables the invention apparatus to handle multiple short messages very efficiently. In addition, the new apparatus is devoid of synchronization requirements or wire length restrictions. It also has the ability to track the speed improvements of new technologies and to increase performance as the technology used to implement the invention apparatus improves.

DETAILED DESCRIPTION OF THE PREFERRED METHOD and EMBODIMENT

Figure 1:
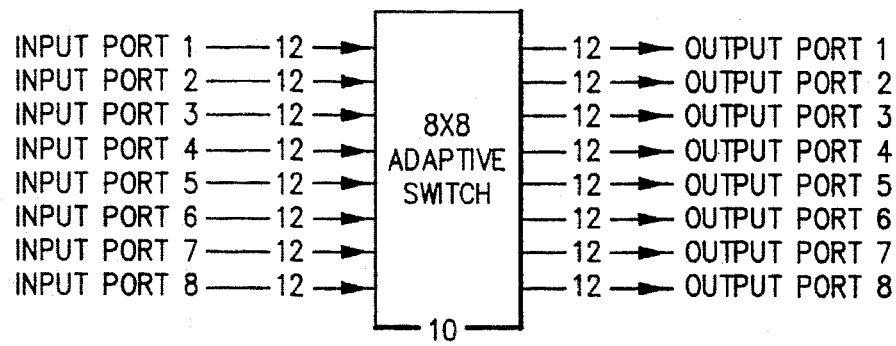
FIG. 1 illustrates generally our preferred switch embodiment for implementing the increasing probability network, which is a modified asynchronous switching apparatus having the network interface required to enable the adaptive qualities to be implemented.
Figure 1:
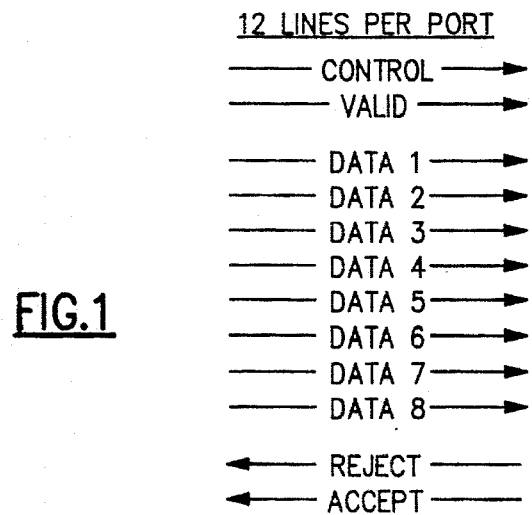

The invention uses intelligent switching apparatus devices to aid in the increasing probability process. The switching device used is disclosed by the co-pending application, U.S. Ser. No. 07/947,023 now issued as U.S. Pat. No. 5,345,229, "Adaptive Switching Apparatus" by H. T. Olnowich etal. The adaptive switching appartus is a modification of the high speed and low latency switch interconnection techniques disclosed in the parent application, the ALLNODE Switch (Asynchronous, Low Latency, inter-NODE switch), which is disclosed in U.S. Ser. No. 07/677, 543 continued as U.S. Ser. No. 08/457,789 filed Jun. 2, 1995. FIG. 1 illustrates generally our preferred embodiment of modifying the asynchronous Allnode switching apparatus 10m to support 8 input ports and 8 output ports having 12 interface signals per port.

The modification is to add one signal line in the interface to each input and output port of the parent Allnode switch. FIG. 1 shows the added signal to be the CONTROL signal at each of the input ports and output ports of switching apparatus 10m. Each additional signal contains adaptive control information that accompanies the data and other 3 control signals at each port that are normally provided to the Allnode Switch. This has a minimum impact of adding one extra input/output connection to the switch chip for every switch input and output port, assuming the the switching apparatus is packaged using standard single chip technology.

Figure 2:
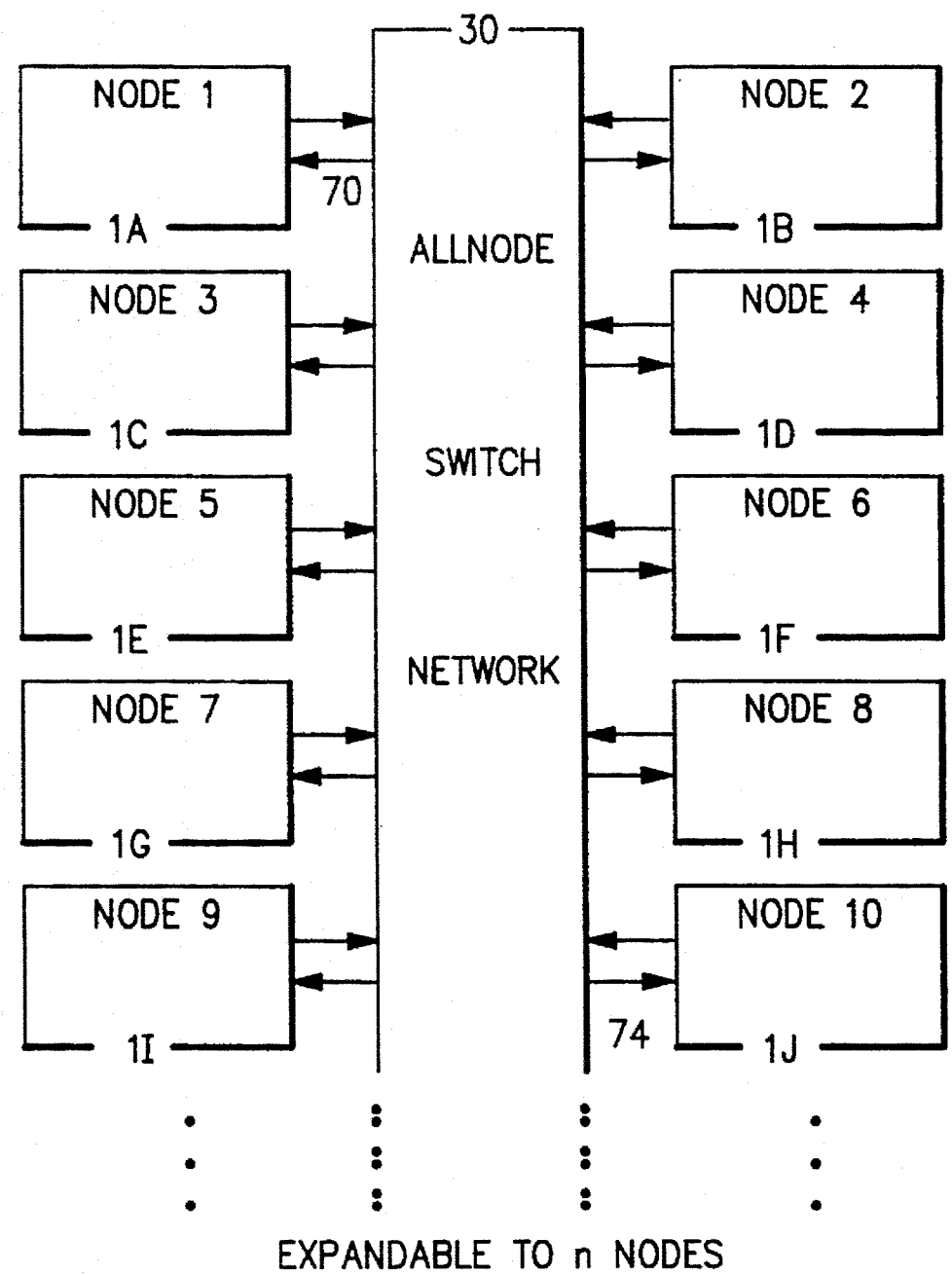
FIG. 2 illustrates generally the method used to interconnect multiple nodes of a parallel system using the increasing probability network.

Referring to FIG. 2, the preferred embodiment for interconnecting n parallel nodes via a multi-stage, interconnection network 30 using switching elements is shown, where network 30 implements the increasing probability network. The preferred switching elements of network 30 is the basic asynchronous and unbuffered Allnode switching concept disclosed in the parent application U.S. Ser. No. 07/677,543 continued as U.S. Ser. No. 08/457,789 filed Jun. 2, 1995, and modified by the present invention to incorporate adaptive qualities. The Allnode Switching apparatus provides a switching network communication structure that has the characteristic of simplicity of implementation, and does not require data buffering or data conversion of any kind. It establishes or breaks connections instantaneously and is, therefore, dynamically changeable with a very quick response time. It has the capability of resolving requests to establish connections in a parallel manner, where n connections can be established or broken at the same time (where n=the number of elements of the system which are communicating via the switching network). Thus, the number of connections that can be made or broken simultaneously scales directly with the size of the system. This capability enables the invention apparatus to handle multiple short messages very efficiently. In addition, the new apparatus is devoid of synchronization requirements or wire length restrictions. It also has the ability to track the speed improvements of new technologies and to increase performance as the technology used to implement the invention apparatus improves. In addition, the Allnode switching apparatus can be cascaded with other identical apparatus devices to form interconnection networks among any number of system elements or nodes. Said network 30 would have the characteristics for full parallel interconnection.

The preferred embodiment uses only unidirectional interfaces, and therefore FIG. 2 shows the switch interface 70 to be comprised of two unidirectional sets of lines, one carrying data from node 1A, and one carrying data to the switch network from node 1A, and one carrying data from the switch network to node 1A.

It is here understood that the FIGS. 3 to 9 are illustrations which are common to U.S. Ser. No. 07/677,543, continued as U.S. Ser. No. 08/457,789 filed Jun. 2, 1995, the parent application which is incorporated herein by reference as to all of its contents. FIGS. 3 to 9 refer to a 4×4 crossbar implementation of the Allnode switch to illustrate the principles and speed of the switching concept.

Figure 3:
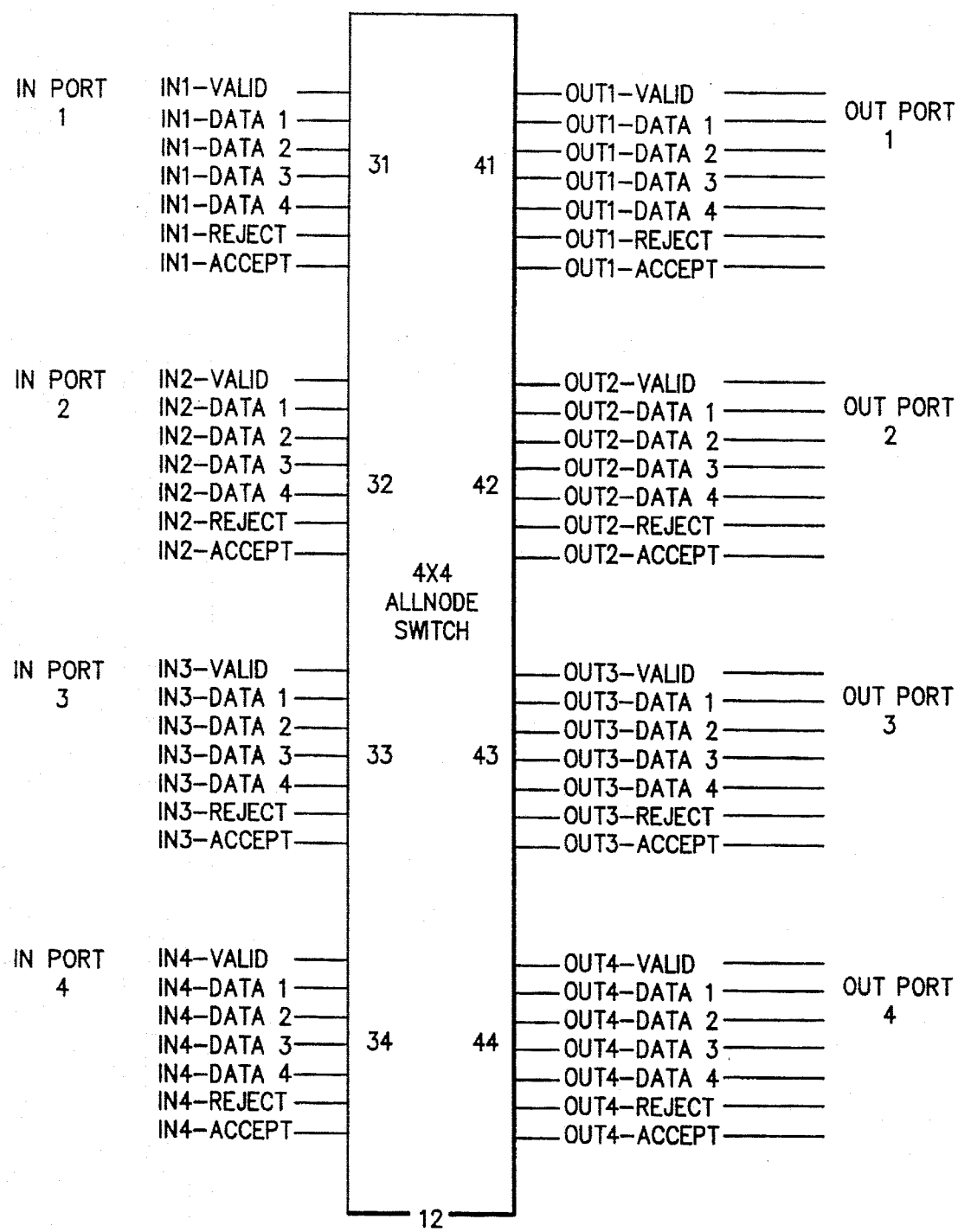
FIG. 3 illustrates the parent four input and four output (4×4) crossbar switching apparatus, which operates asynchronously and has the capability of being modified to provide the disclosed improvements.

Referring to FIG. 3, the preferred embodiment is a 4×4 switching apparatus 12, where the function of the present invention is to provide a means of connecting any of 4 sets of digital, analog, or optical inputs on a mutually exclusive basis to any one of the unused 4 output ports. The 4×4 switching apparatus 12 can support up to 4 simultaneous connections at any given time. For instance, Input 1 could be connected to Output 3, Input 2 to Output 4, Input 3 to Output 2, and Input 4 to Output 1.

The invention switching apparatus 12 is unidirectional, which means that data flows in only one direction across the said switching apparatus 12, that being from input to output. Switching apparatus 12 interfaces are defined in detail in FIG. 3. The set of lines 31, 32, 33, and 34 at each in-port to the switching apparatus 12 are identical in number and function to the set of lines 41, 42, 43, and 44 at each out-port. The sets of interface lines to each input and output port contain seven unique signals: 4 digital data lines, and 3 digital control lines (VALID, REJECT, and ACCEPT). The signals at each port are differentiated by a prefix of INX- or OUTX- indicating the direction and number of the port (X) that they are associated with. The four digital data and one VALID lines have a signal flow in the direction going from input to output across switching apparatus 12, while the digital REJECT and ACCEPT control lines have a signal flow in the opposite direction.

Each unidirectional switch interface set requires only 7 signals, as shown in FIG. 3, to transmit and control and data through the network 30—the digital data and control transfer width is ½ byte (4 bits) at a time. The signals required are:

DATA: 4 parallel signals used to command switch connections and transmit digital data messages or digital control headers.
VALID: When active, indicates that a digital message, control header, or analog waveform is in the process of being transmitted. When inactive, indicates a RESET command and causes all switches to reset to the IDLE state.
REJECT: Signal flow is in the opposite direction from the DATA and VALID signals. When active, it indicates that a REJECT or error condition has been detected.
ACCEPT: Signal flow is in the same direction as the REJECT signal. When in the low state, it indicates that a message is in the process of being received and checked for accuracy. When active, it indicates the message has been received correctly.

Figure 4:
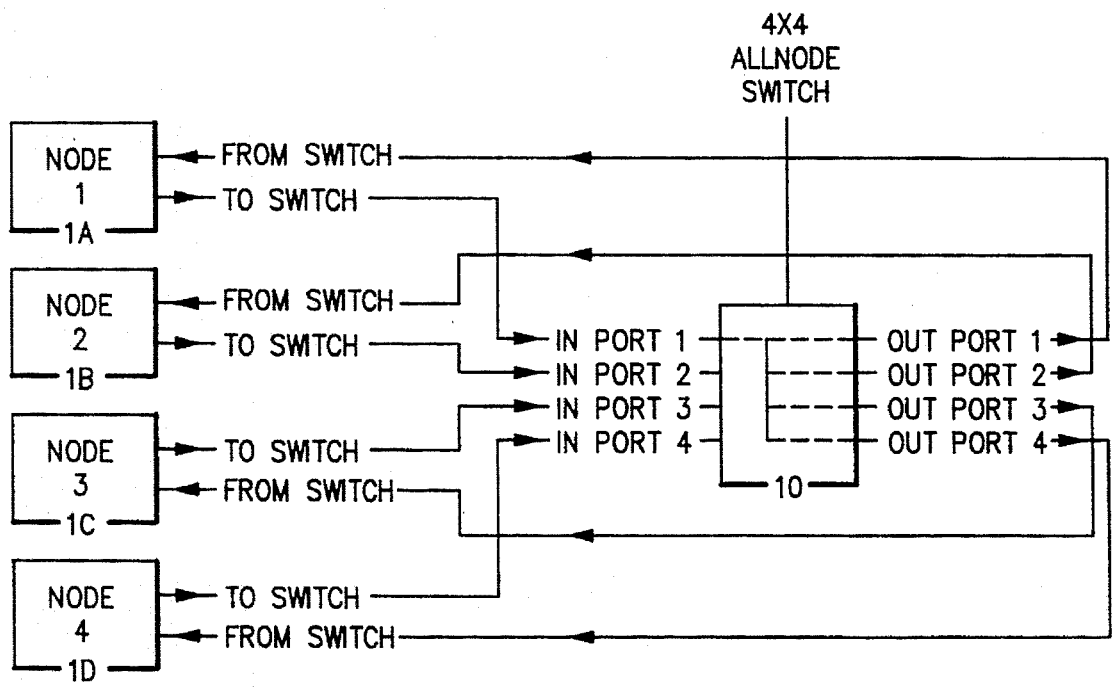
FIG. 4 illustrates the interconnections required to a four input and four output (4×4) crossbar switching apparatus to provide full interconnection amongst four nodes.

As illustrated by FIG. 4 the ALLNODE switching apparatus would be provided for a node having a plurality of input and output ports, and would comprise the connection control circuit for each input port, and a multiplexer control circuit for each output port for connecting any of I inputs to any of Z outputs, where I and Z can assume any unique value greater or equal to two, as in the parent application.

FIG. 4 shows a 4×4 crossbar ALLNODE switching apparatus, where the ALLNODE switching apparatus 10 is unidirectional, which means that data flows in only one direction across the said switching apparatus 10, that being from input to output. Although the said switch apparatus 10 is unidirectional, it supports bidirectional communication amongst four nodes (1A, 1B, 1C, and 1D) by connecting the 4×4 ALL-NODE switching apparatus 10 as shown in FIG. 3. Each node 1A, 1B, 1C, and 1D has two sets of unidirectional interconnecting wires, one going to the switch 10 and one coming from the switch 10. The dashed lines internal to the switching apparatus 10 indicate that the function of the said switching apparatus is to connect an input port such as INPUT PORT 1 to one of four possible output ports. The switching apparatus 10 provides exactly the same function for each input port, allowing it to be connected to any unused output port.

Figure 5:
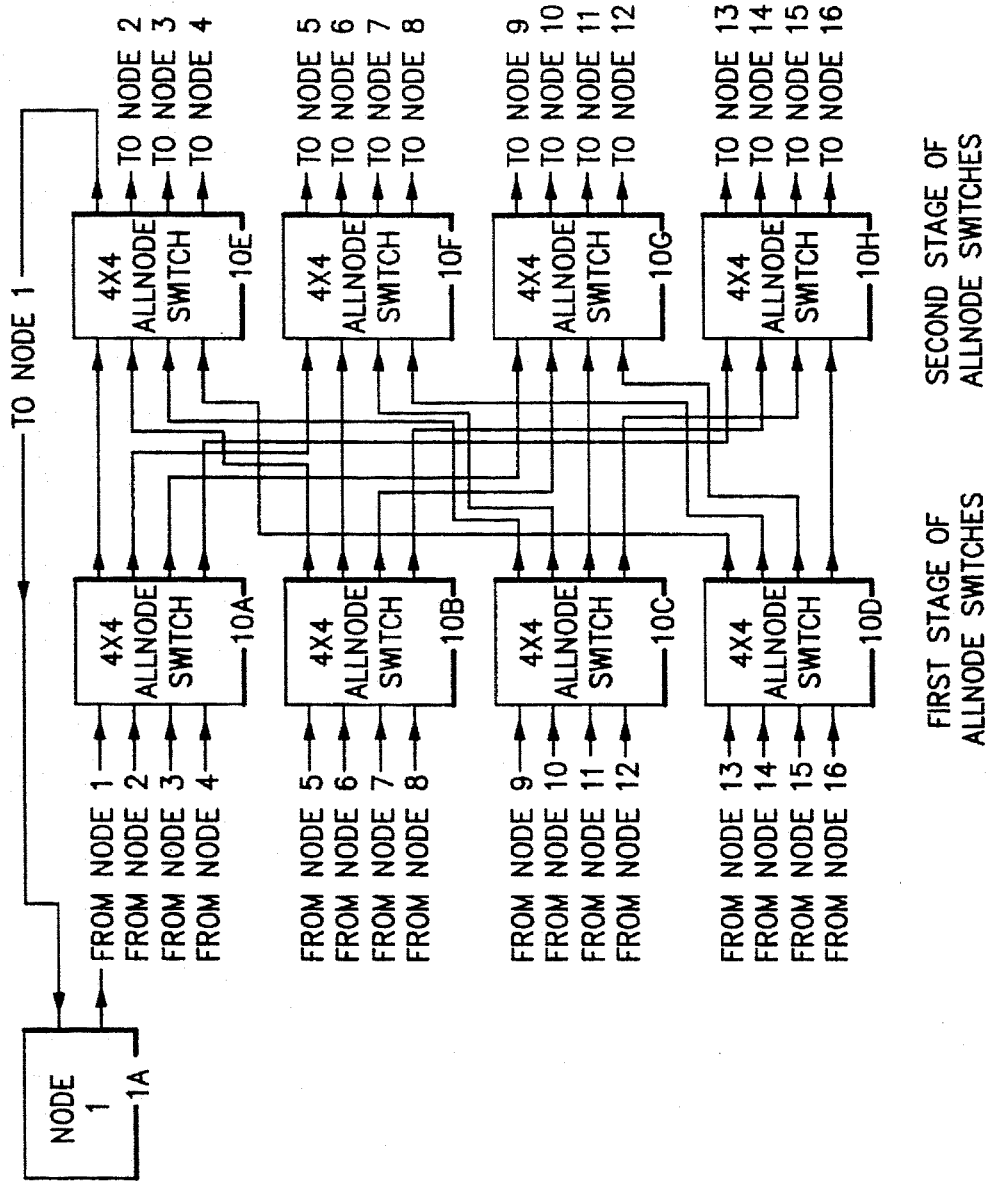
FIG. 5 shows a typical method for cascading the 4×4 asynchronous switching apparatus devices to accomodate parallel systems having more than 4 nodes.

Referring to FIG. 5, a method is illustrated for increasing the number of nodes in a system by cascading eight switching apparatus 10 blocks. The eight cascaded switches are denoted as 10A through 10H to indicate that they are identical copies of switching apparatus 10, varying only in regards to the wiring of their input and output ports. It can be noted that any of sixteen nodes can communicate to any other node over a connection that passes through exactly two of the switching apparatus 10 blocks. For instance, Node 5 can send messages to Node 15 by traversing switch 10B and switch 10H. Since all connections are made through two switching apparatus 10 blocks, the network comprised of the eight switching apparatus 10 blocks is referred to as a two stage switching network. Other multi-stage networks can be configured from switching apparatus 12 blocks by using three stages, four stages, etc. in a similar manner.

Figure 6:
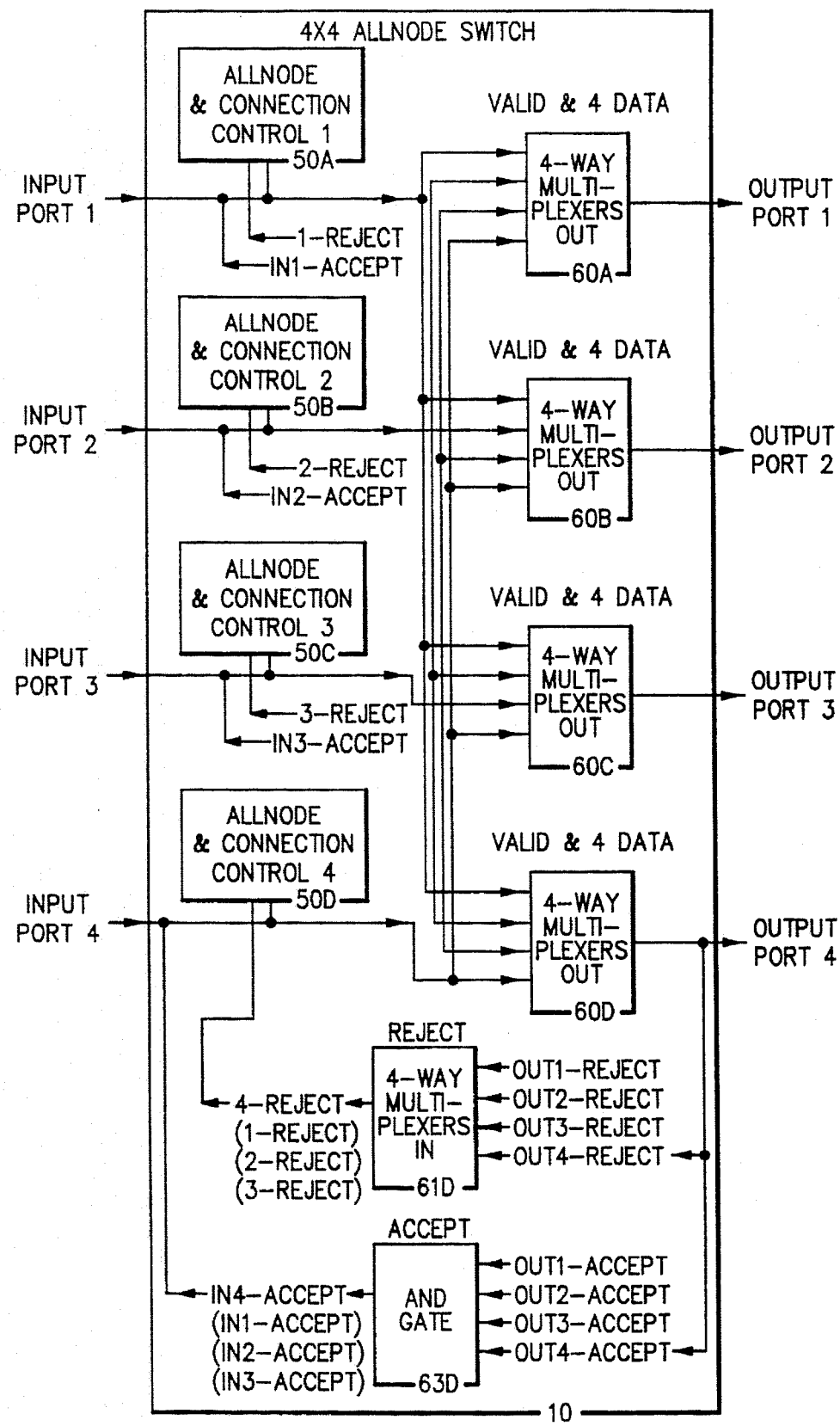
FIG. 6 shows a schematic block diagram of the simple digital data flow and control path implementations of the 4×4 asynchronous switching apparatus, which has the capability of being modified by the present invention to provide fully parallel switching means for interconnecting up to four system nodes for the purpose of transferring digital data.

Referring to FIG. 6, a functional diagram of the simple data flow across ALLNODE switching apparatus 10 is illustrated. The VALID and four data lines at each input port, inside the switch, and at each output port are represented by a single line in FIG. 6 for simplicity. For instance, the VALID and four data lines entering switch 10 at IN PORT 1 go to five internal functional blocks of switching apparatus 10; these are blocks 50A, 60A, 60B, 60C, and 60D. Block 50A makes the decision as to which of the four possible output ports are to be connected to input port 1. The VALID and four data lines from each input port go to each output multiplexer block (60A, 60B, 60C, and 60D); this makes it possible to connect any input port to any output port. Each of the four output multiplexer blocks (60A, 60B, 60C, and 60D) is uniquely commanded from each of the control blocks (50A, 50B, 50C, and 50D) as to which of the four possible sets of input port lines is to be gated through to each output port. For instance, control block 50A can command multiplexer 60C to connect input port 1 to output port 3; control block 50B can command multiplexer 60A to connect input port 2 to output port 1; and control block 50C can command multiplexers 60B and 60D to connect input port 3 in a multi-cast fashion to output port 2 and output port 4. All three connections are capable of being established simultaneously or at different times. At the same time that multiplexers 60A to 60D form connections to move the VALID and data signals across switch 12 with a unidirectional signal flow from input port to output port, multiplexer 61D and AND gate 63D form signal connections for the REJECT and ACCEPT signals, respectively, with a signal flow in the opposite direction of output port to input port (typical implementations are shown by blocks 61D and 63D—similar blocks are associated with each input port). These REJECT and ACCEPT signals provide a positive feedback indication to switch 10 of actions taken either by subsequent switch 10 stages in a cascaded network or by the device receiving and interpreting the VALID and four data signals. A control header or digital message being transmitted through switching apparatus 10 over the four data signals under control of the VALID signal can be REJECTed by any network stage if it is unable to establish the commanded connection or by the receiving device if it is not capable of receiving the message at this time or if it detects an error in the transmission. The receiving device also has the capability of confirming the correct arrival of a command or message (without errors being detected) by pulsing the ACCEPT signal. Since the REJECT and ACCEPT signals go in the opposite direction from the data flow, they provide a means of reporting back a positive indication to the sender on whether the attempted transmission was received correctly or rejected.

Figure 7:
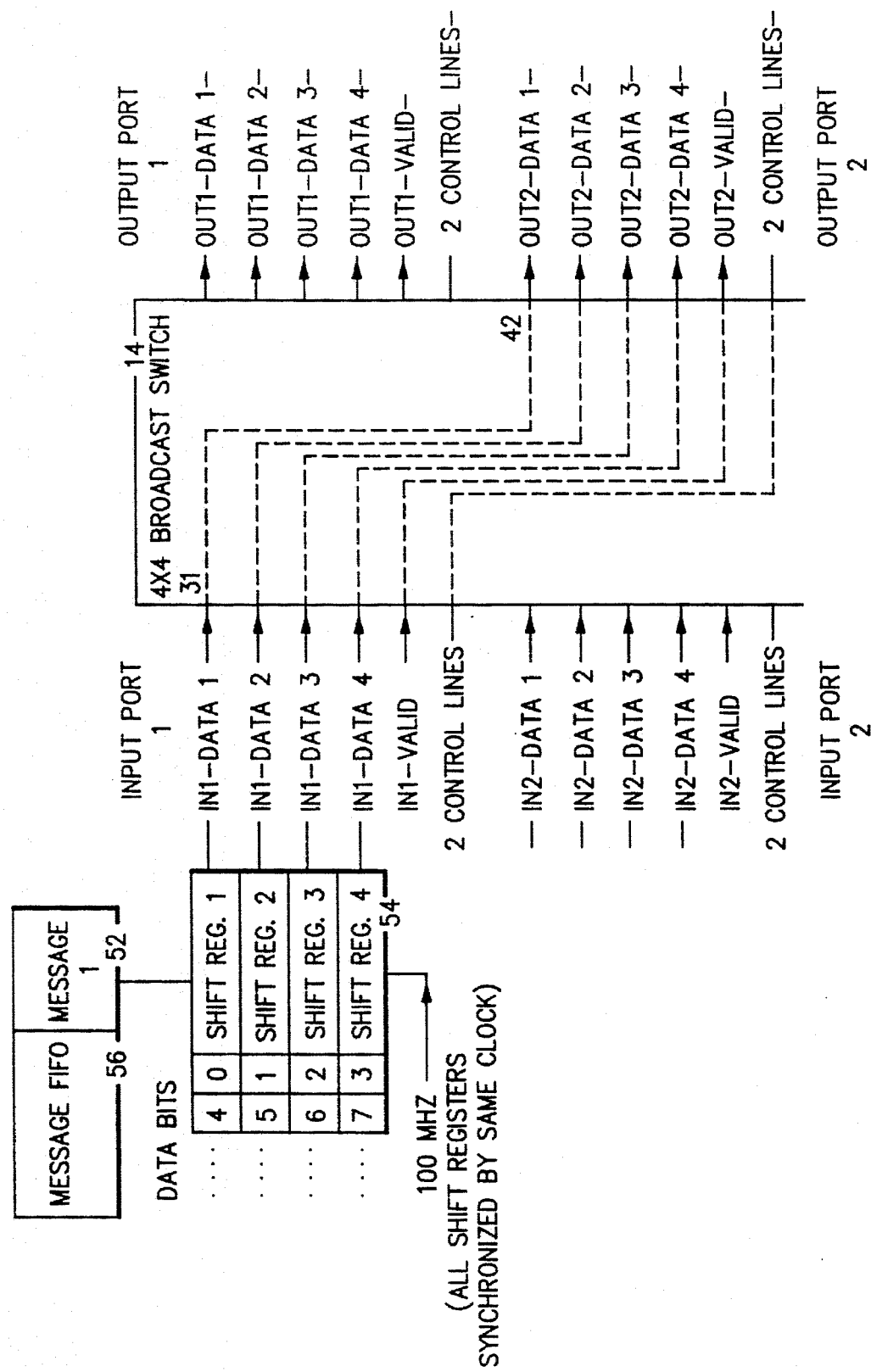
FIG. 7 illustrates a typical method for generating parallel control and and , multiple line serial digital data information to be sent to the 4×4 prior parent embodiment of the invention switching apparatus over four synchronous data lines.

Referring to FIG. 7, blocks 56, 52, and 54 illustrate a typical method for generating multi-line (parallel)/serial digital data in the form of a message which can be transmitted to and across switching apparatus 14, which is a partial drawing of the switching apparatus 12. Similar parallel/serial data generation logic as provided by 56, 52, and 54 can be used at each of the other input ports to switching apparatus 12. Each set of input data lines provides 4 serial data lines to a given input port which is synchronized to the same clock by the four shift registers 54 which create the parallel/serial data by shifting four synchronized lines of data 31 as controlled by the same identical clocking signal (100 MHZ in FIG. 6). However, the four different input port sources (31, 32, 33, and 34 of FIG. 3) to switching apparatus 14 can be asynchronous to each other, being based on different, non-synchronized, 100 MHZ clocking signals.

The process for sending parallel/serial messages through switching apparatus 14 involves FIFO 56, which accumulates data messages to be transmitted. The next entire message to be transmitted is moved to buffer 52. The message stored in buffer 52 is moved to shift registers 54 in preparation for transmittal and the data is dispersed across the four shift registers 54 by placing data bit 0 into the first bit of shift register 1, data bit 1 into the first bit of shift register 2, data bit 2 into the first bit of shift register 3, data bit 3 into the first bit of shift register 4, data bit 4 into the second bit of shift register 1, etc. Shift registers 54 then begin to send serial data to switching apparatus 14 over four synchronized data lines, in such a manner that the parallel/serial data flows continuously until the entire message has been transmitted. The switch apparatus 14 uses the first eight bits transmitted (in the first two clock cycles of serial data over interface 31 from serial registers 54 to switching apparatus 14) to select and establish a connection path through the switching apparatus 14. The example in FIG. 7 illustrates via dashed lines, the switching apparatus establishing a temporary connection between input port 1 (31) and output port 2 (42), such that each of the eight individual lines in interface 31 are uniquely and directly connected to each of the corresponding lines in interface 42.

Figure 8:
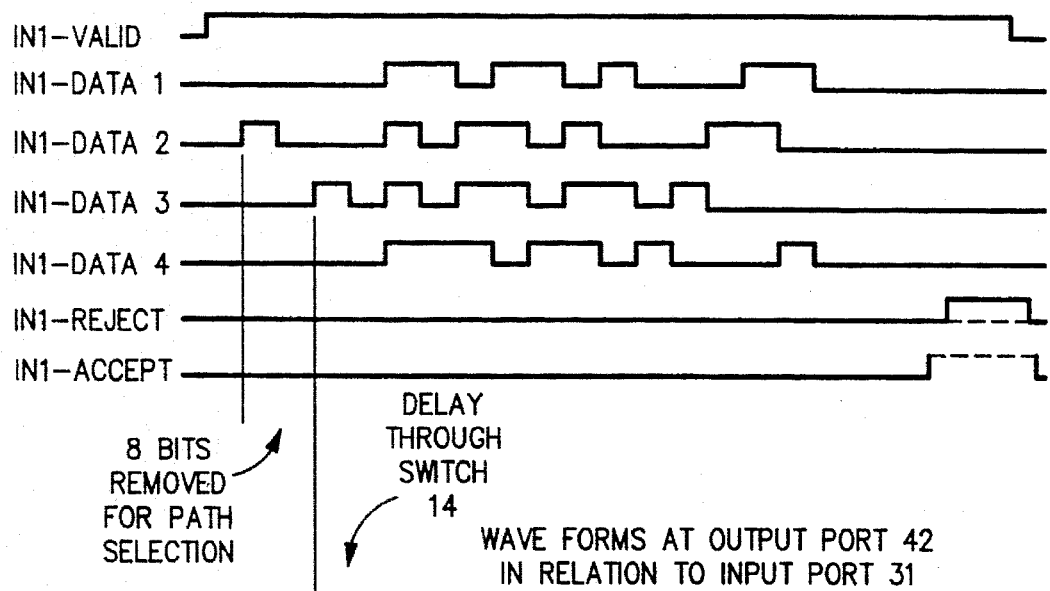
FIG. 8 shows a typical timing diagram for routing the digital interface signals arriving at one input port of the 4×4 prior parent embodiment of the invention switching apparatus to one output port.

Referring to FIG. 8, typical serial waveforms are shown for both input and output ports of the switching apparatus 14. The switch removes the first 8 bits of the serial transmission as sent by shift registers 54 and uses them to make and hold a connection, such as interface 31 to interface 42. The remainder of the serial message in our example is transferred directly from interface 31 to interface 42, so that interface 42 sees that exact same message that interface 31 receives, minus the first 8 bits and delayed by the circuit delays encountered by the serial data as it traverses the switching apparatus 14. Switching apparatus 14 does not buffer or re-clock the serial data entering via interface 31 in any manner; it merely reflects as quickly as possible the input waveforms it receives over interface 31 to output interface 42 without changing them in any way, except to strip off the first 8 bits.

The convention for indicating to a switch 14 input port over an interface (such as 31) that there is no transfer in progress, is to issue continuous IDLE commands, which are denoted by the 4 data lines and the VALID control line being held at logical 0's. The detection of a logical 1 on any of the input lines will signify the departure from the IDLE state and signify to the switch that a selection and transfer is beginning. Likewise, the output lines from the switch will be held in the IDLE state (at all 0's), when there is no active transfer in progress.

In general, all switches require a path selection method, whereby they are commanded which connection (input port to output port) to establish. For switching apparatus 10, the path selection command is transmitted to the switch over the same interface that the data is transferred; i.e., the 4 data lines associated with each input port. Selection information must be transferred prior to the data, so that the commanded interconnections can be established and the data can then flow to the commanded destination. The selection information need NOT identify an input port number (1 to 4), because it is arriving at the switch over a specific input and the switch already knows what input number it is receiving data on. Therefore, the selection information need ONLY specify the number (1 to 4) of which one of the four output ports of switching apparatus 10 to which to connect. The method of path selection recommended here is one out of N encoding with a return to zero (called a DEAD FIELD).

Figure 9:
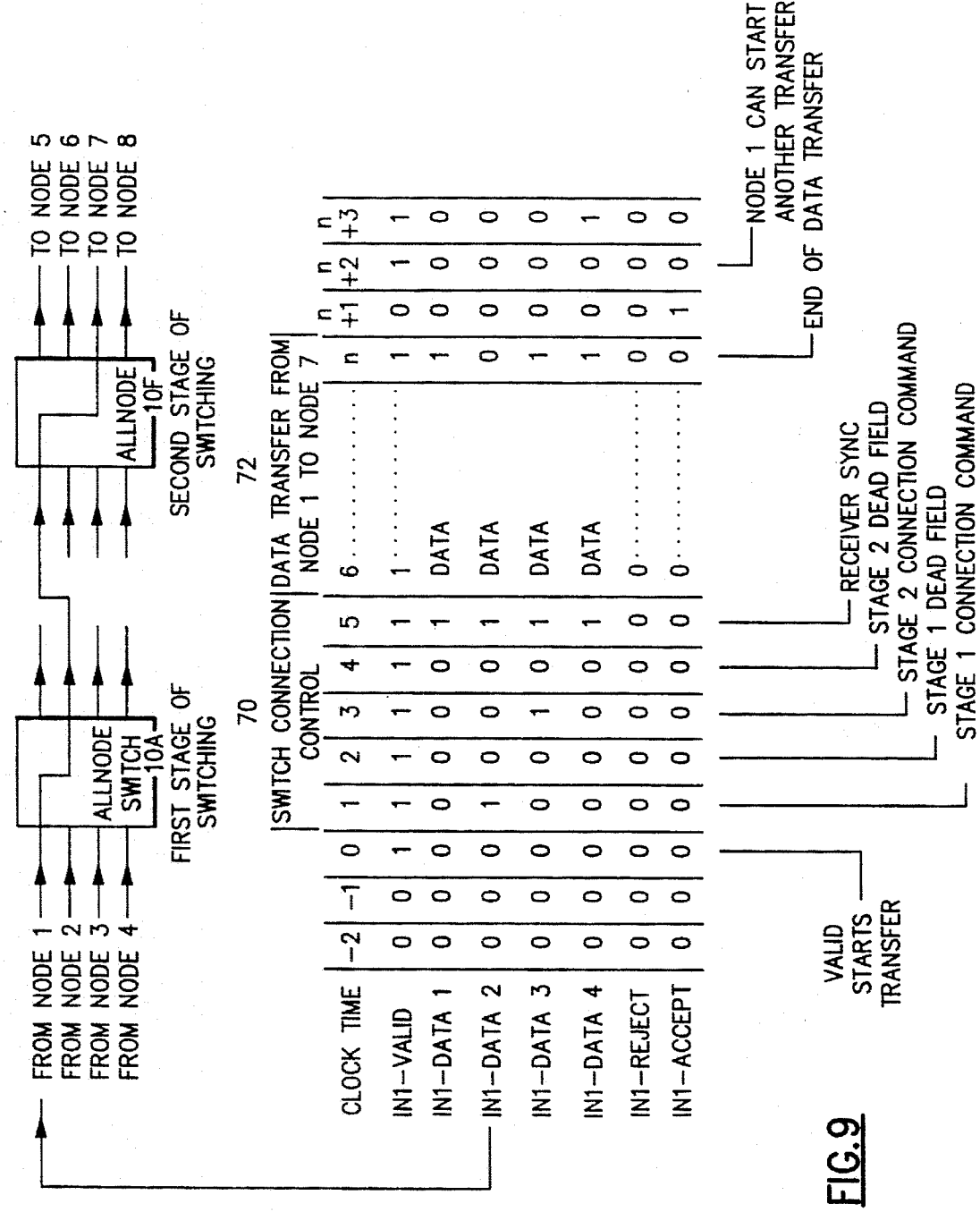
FIG. 9 illustrates the typical method of selecting and establishing a transmission path through a network comprised of the invention switching apparatus for the purpose of sending digital data from one node to another.

Referring to FIG. 9, a typical example of the exact serial bit patterns and control signal activation is shown for sending control and digital data information to switching apparatus 10. The example references the cascaded, two stage switching network shown in FIG. 5 and involves sending data across the network from node 1 through switching apparatus 10A and 10F to node 7. To make this connection, input port 1 must be connected to output port 2 of the first stage switching apparatus 10A, and input port 1 must be connected to output port 3 of the second stage switching apparatus 10F. The signal sequence that is sent to input port 1 to cause the desired connections in switching apparatus 10A and 10F is shown in FIG. 5. In the signal sequence of 1's and 0's, time advances from left to right, so that the values seen at clock time −2 arrive at switch 10A first, and the values at clock time −1 arrive second, etc. The values of the IN1-DATA and IN1-VALID lines are all zeroes and cause nothing to happen at switch 10A during times −2 and −1, because they indicate IDLE. At clock time 0, the IN1-VALID line goes to a logical 1. This prepares switch 10A by enabling the input port 1 to receive data, but no connection or action takes place at switch 10A at this time. The IN1-VALID control line basically enables the corresponding switch input port; when IN1-VALID is a logical 0, switch 10A cannot make any connections or receive any data from input port 1, which is held RESET. Finally, at clock time 1, switch 10A receives its command as to what output port to connect to; the command is received entirely during clock time 1.

The command bit pattern sent at clock time 1 is used by switch 10A to establish connection to an output port; this process is referred to as a path selection operation and takes place completely internal to switch 10A. The path selection approach implemented by the present ALL-NODE switch invention is to let each of the 4 IN1-DATA lines to define a unique output of switch 10A to be selected. For instance, IN1-DATA1 signal going to a logical 1 at time 1 tells switch 10A to connect to output port 1, IN1-DATA2 commands connection to output port 2, etc. In our example, since IN1-DATA2 goes to a logical 1 during clock time 1, switch 10A is thereby commanded to connect to output port 2. In other words, the connection algorithm is that the first data input line going to a logical 1 after an input port has been enabled, defines the connection which that input port is to make. This is a mutually exclusive process, in that for the normal case only one data line at clock time 1 is allowed to be a logical 1; the other 3 data lines must be 0's. Note that since 1 bit of selection information is guaranteed to be a logical 1, switch 10A will be able to recognize the start of a transmission without requiring any additional bits to signify that a transfer is commencing. The switch 10A makes the commanded connection by removing the 4 bits from the data lines and storing them in a selection register in control block 50A of FIG. 8. The bits transmitted during clock time 1 are not passed through switch 10A to switch 10F, but instead switch 10A begins passing the very next 4 bits of data corresponding to clock time 2 to the next switch 10F. However, the information bits following a selection command (those transmitted by the 4 data lines at clock time 2 in our example) must always be all zeroes (a DEAD FIELD) as shown in FIG. 8. The purpose of this will be explained subsequently.

At clock time 2, the connection of switch 10A input port 1 to output port 2 is established and causes the signal sequence at clock time 2 to be transmitted across switch 10A and the interconnecting wires to switch 10F input port 1. From this time on, switch 10A merely transmits all subsequent data immediately to switch 10F input port 1; it never examines or takes any action on any other data patterns presented to switch 10A over its input port 1 interface. It just passes all data patterns it receives over input port 1 immediately to the output port 2 and switch 10F. Thus, at clock time 2, assuming zero delay across switch 10A and its associated cable, switch 10F input port 1 sees the VALID signal rise and the all zeroes DEAD FIELD on the 4 data lines coming into switch 10F input port 1. In this way, at time 2, switch 10F input port 1 is enabled in an identical manner to the way switch 10A input port 1 was enabled previously at time 0.

In our example, IN1-DATA3 goes to a logical 1 during clock time 3 and switch 10F is thereby commanded to connect its input port 1 to its output port 3, in a manner similar to the way switch 10A was commanded to connect its input port 1 to its output 2 during clock time 1. The switch 10F in making the commanded connection, removes the 4 bits at clock time 3 from the data lines, and stores them in the selection register which is pad of control block 50A of FIG. 5. The bits transmitted during clock time 3 are not passed through switch 10F to Node 7, but instead switch 10F begins passing the very next 4 bits of data corresponding to clock time 4 to Node 7. However, the information bits following a selection command (those transmitted by the 4 data lines at clock time 4 in our example) must always be all zeroes (a DEAD FIELD) as shown in FIG. 8. Thus, by clock time 4, switches 10A and 10F have established a connection path for transferring data directly from Node 1 to Node 7. Up to clock time 5, Node 7 sees nothing but IDLE commands. At time 4, Node 7 sees the OUT3-VALID line from switch 10F go active and is thereby enabled to start receiving data at time 5. From time 5 on, Node 7 can receive data from Node 1 over the 4 OUT3-DATA lines from switch 10F. The protocol of the actual data being transmitted can be any of the normal formats such as manchester encoded, 8/10 bit encoding with preamble, etc. However, the preferred embodiment, as shown in FIG. 8 is an all ones synchronization field at time 5, followed by the NRZ data message. The data message can specify the word count length of the transfer. The purpose of the synchronization field of all ones as a prefix to the actual data message, is to enable the receiving node 7 to synchronize to the sending node 1 in one clock time. This assumes that the two nodes involved in the data transfer have clocking systems that are asynchronous to each other, but are operating at the same frequency within a specified tolerance.

The preferred embodiment is to transmit the word count length of the message first during clock time 6 and clock time 7. Node 7 then decrements the length count and can detect when the transfer is complete. Node 7 can then check the message for accuracy using the selected error detection method (parity, ECC, or CRC). If the message has been received correctly, Node 7 responds by activating the ACCEPT interface line back to switch 10F at clock times n+1 and n+2. Switch 10F passes the ACCEPT indication back to switch 10A, which in turn returns it immediately to Node 1. This indicates to Node 1 that the transfer completed successfully, and Node 1 resets its VALID and 4 data lines to switch 10A to zeroes, thus, completing the data transfer and returning to the IDLE state. The IN1-VALID input line to switch 10A going to a zero at time n+3, causes switch 10A input port 1 to break its connection to output port 2 and to return to the IDLE state. Immediately, switch 10F sees its IN1-VALID input line go to a zero, breaks its connection to output port 3 and returns to the IDLE state. Thus, the connections can be broken and the switches returned to IDLE in as little as one clock time. If Node 1 has another message to transmit, it can load the next message into buffer 52 and shift registers 54 (FIG. 7), and begin transmission to Node 7 or any other node as soon as time n+4. The only restriction is that the VALID signal generated by Node 1 must return to zero for a minimum of one clock time (time n+3) to signify the end of one transfer before beginning another.

If Node 7 finds an error in the message it has received after the word count has gone to zero at clock time n, it responds by activating the REJECT interface line (instead of ACCEPT) back to switch 10F. Switch 10F uses the incoming REJECT signal from Node 7 to break its connection to Node 7, to return to the IDLE state, and to pass the REJECT indication back to switch 10A, which in turn returns it immediately to Node 1 after breaking its connections and returning to IDLE. Node 1 then notes that the transfer has been rejected, and returns to the IDLE state by resetting its VALID and 4 data lines to switch 10A to zeroes. Node 1 may then retry the transmission by reloading shift registers 54 from buffer 52 and starting the transmission over again from the very beginning (clock time −1). The retransmission can occur over the identical path as the previously rejected transmission, or if alternate paths through the network are implemented another path can be tried. If continuous REJECTs are encountered, such that a specified number of REJECTs occur for the same message, an error reporting mechanism may be invoked.

It is also possible for any switch 10 in a network path to REJECT a message. This can occur for either of two cases:

1) BUSY—If the output port to which the switch is commanded to connect is BUSY (i.e., it is being used by a previously established connection), the switch will signify this condition to the input port issuing the command by activating the REJECT line back to the previous network stage or to the transmitter (if the first stage of the network detects BUSY). For instance, in the example shown in FIG. 8, if 10A had received a command at clock time −2 to connect input port 4 to output port 2, that connection would have been active when input port 1 requested to be connected to output port 2 at clock time 1. In this case, output port 2 is BUSY at clock time 1 and switch 10A would activate the IN1-REJECT line to Node 1. As described above, the transmitter may retry any REJECTed message.

Likewise, the connection could be made successfully at switch 10A, yet output port 3 of switch 10F could be BUSY at clock time 3, causing switch 10F to issue the REJECT signal to switch 10A. This, in turn, causes switch 10A to return REJECT immediately to Node 1 after breaking its connections and returning to IDLE.

2) Simultaneous CONTENTION—Rather than input port 4 establishing a connection to output port 2 in switch 10A at clock time −2 as described above (in advance of the same command from input port 1 at clock time 1), it is possible for two or more input ports to try to connect to the same output port at approximately the same time. This is called CONTENTION for an available output port. For instance, suppose input ports 1 and 4 both sent simultaneous commands at clock time 1 requesting to be connected to output port 2. The present invention resolves this contention by first connecting both contending input ports 1 and 4 to output port 2. The net effect is to electrically connect the 2 input ports to output port 2, which will logically OR the signals coming from both sources. During clock time 2 the logical OR of the 2 input ports will NOT cause an error, because the values present on both input ports 1 and 4 are identical: the VALID lines for each are logical 1's and the data lines for each contain the DEAD FIELD (logical 0's). However, at clock time 3, the signals from each source could be different and an error could be caused if the 2 input ports both remained connected at clock time 3 and later. In other words, switch 10A has 1 cycle time (clock time 2) to correct the decision it made to connect two or more inputs to the same output. Switch 10A makes this correction during clock time 2 by detecting the fact that more than one input is connected to a given output. It then takes action by resetting all but one of the multiple connections, and does this before clock time 3 occurs. The decision of which connection(s) to reset and which one to keep is a decision based on priority. For the preferred embodiment, a simple priority scheme is used as follows: If input port 1 is contending it gets the connection, If input port 1 is not contending and input port 2 is, input port 2 gets the connection. If input ports 1 and 2 are not contending and input port 3 is, input port 3 gets the connection. Input port 4 gets the connection only if no other input port wants it. Applying the priority selection to our example, input port 1 gets to keep its connection to output port 2, while the connection of input port 4 to output port 2 is reset during clock time 2. This results in the REJECT signal being issued in the normal fashion from switch 10A to input port 4.

Thus, the purpose of the DEAD FIELD in the present invention is to allow one clock time per switch stage to resolve simultaneous contention. The secondary purposes of the DEAD FIELD are to cause a falling edge on the selection bit which was active during the previous clock time, and to compensate for timing skew which might be present across the 4 data lines carrying serial selection data to the cascaded switches. Both the rise and fall of data bits commanding the switches to make connections gives the unclocked switch two clock edges (rise and fall) on which it can trigger and make decisions. These are the only two decision making times available to the ALL-NODE switch.

Figures 10, 10A:
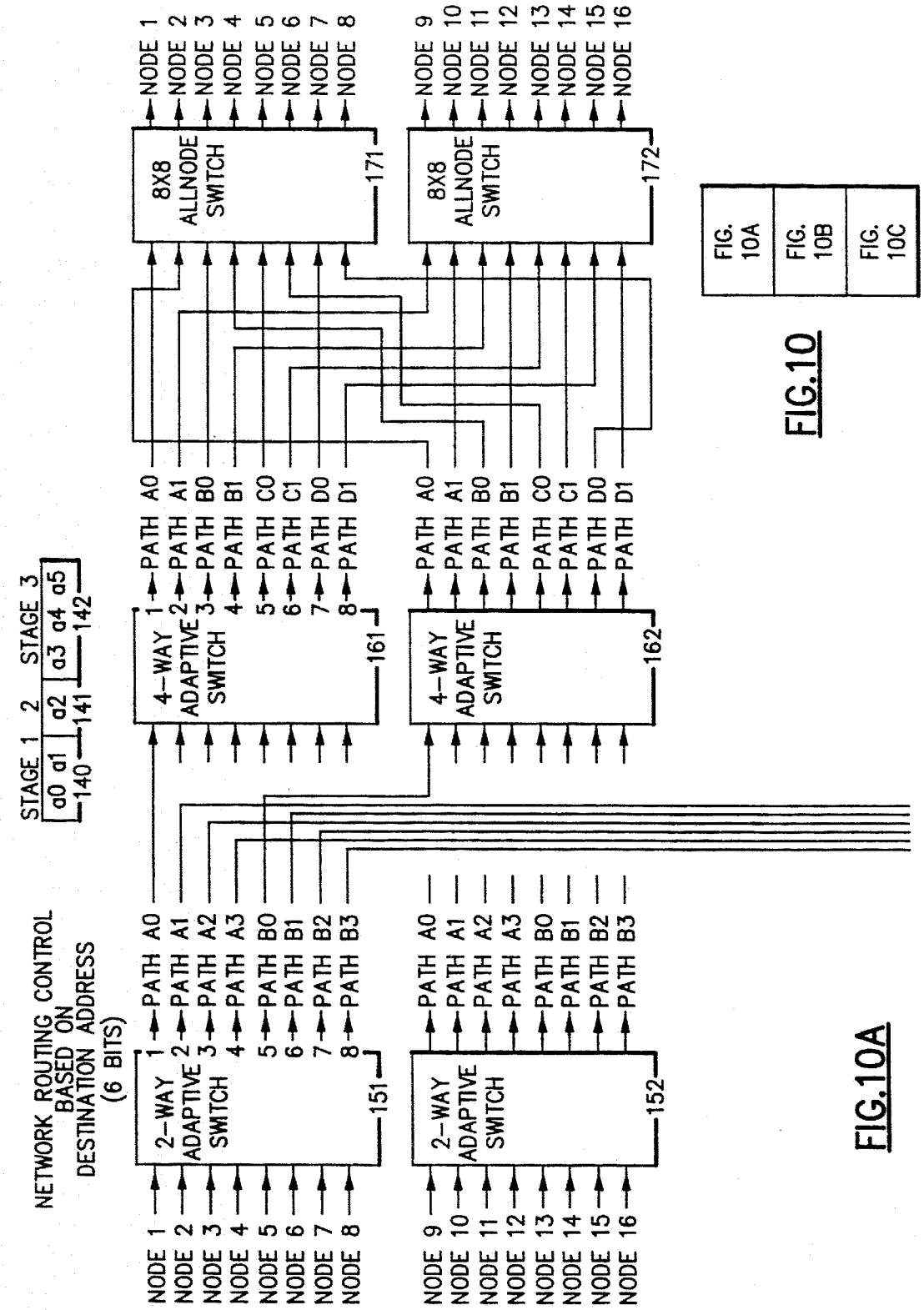
FIG. 10 illustrates the typical multi-stage increasing probability network implemented using multiple copies of the adaptive switching apparatus to interconnect 64 nodes.
Figure 10B:
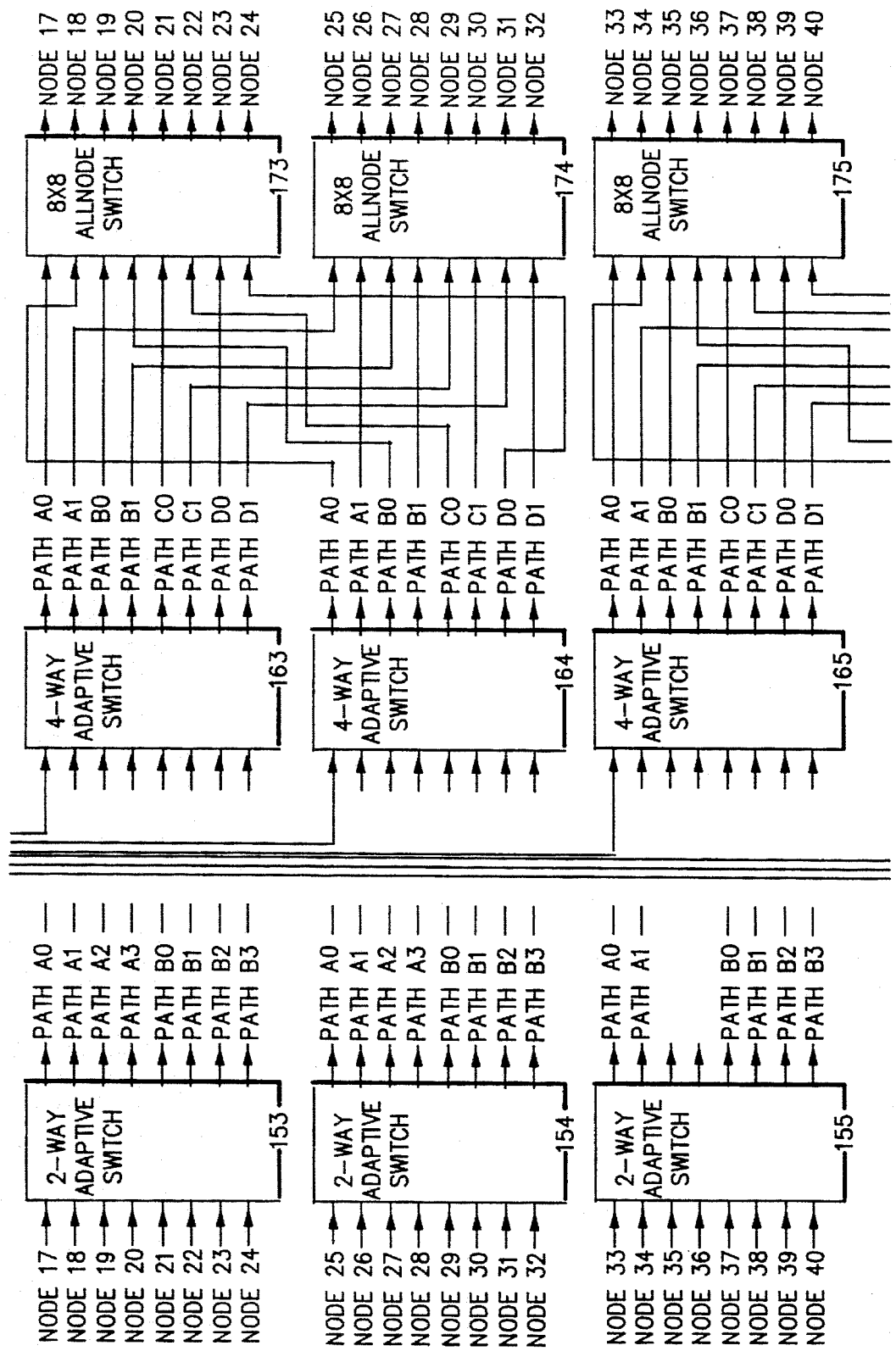
Figure 10C:
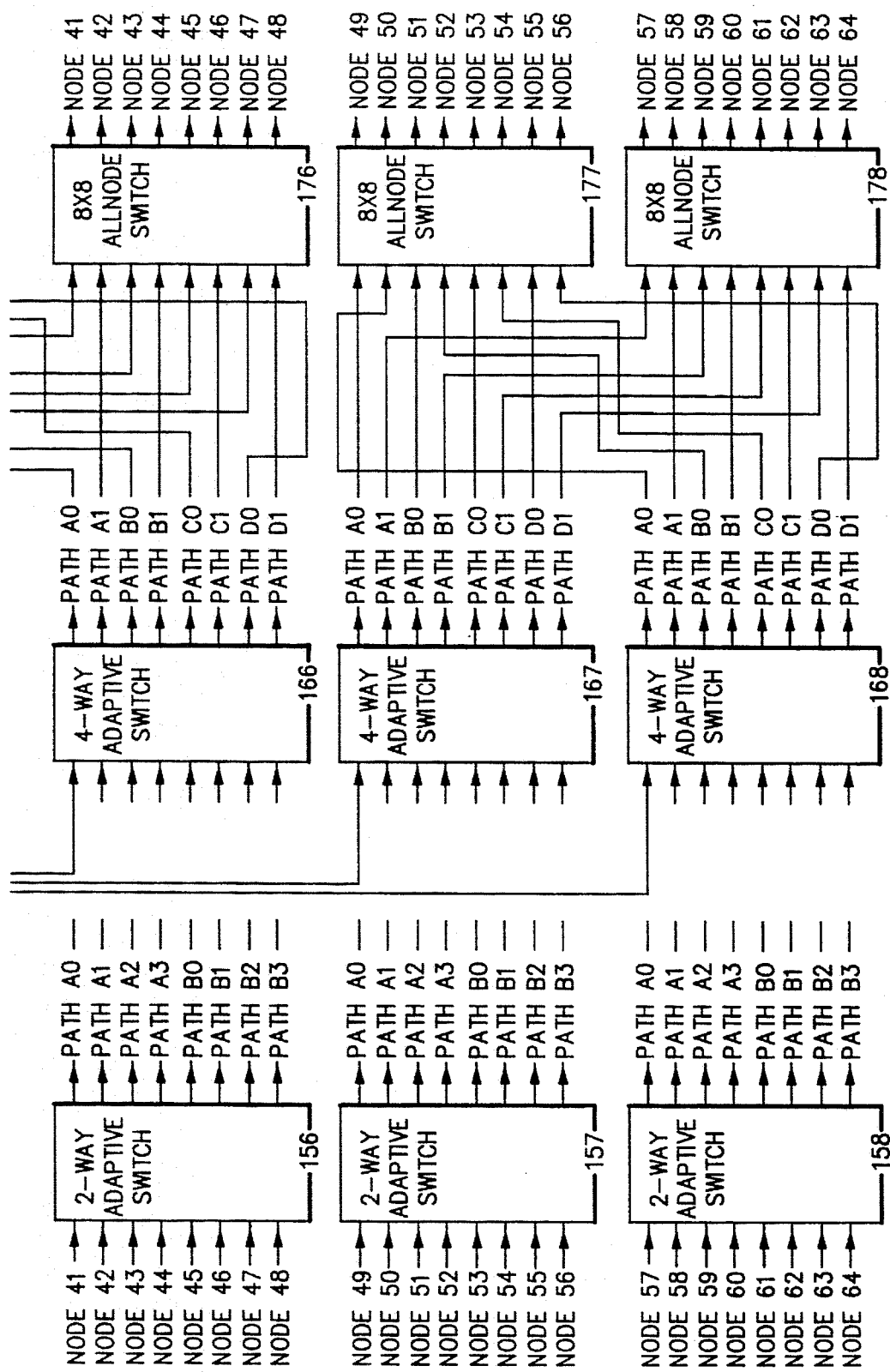
Figure 11:
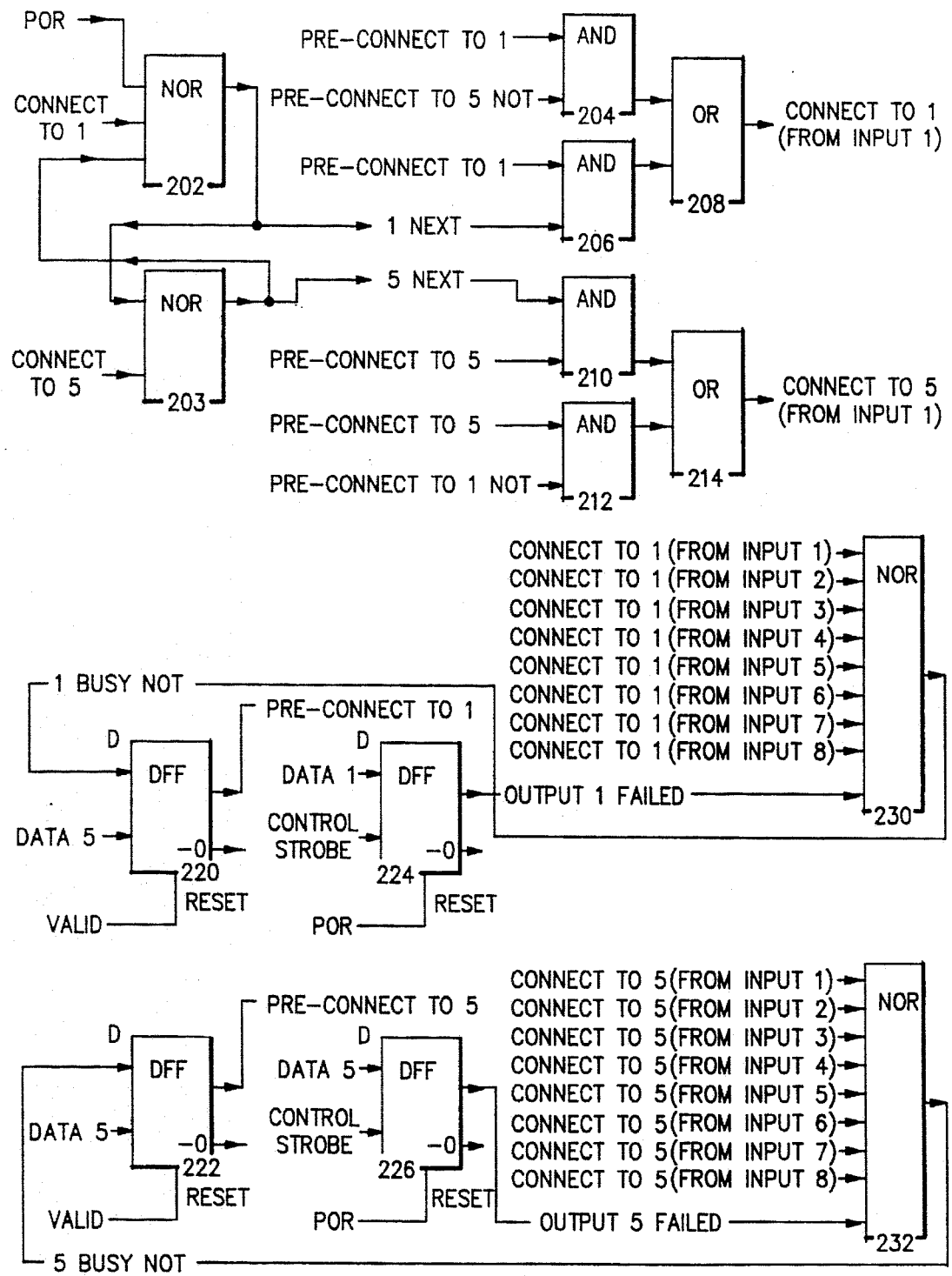
FIG. 11 shows the detailed logic required to typically implement the unique adaptive functions at each individual input port of the present invention adaptive switching apparatus.

Turning now to the adaptive switching apparatus used by the present invention. It is here understood that the FIGS. 10 and 11 are illustrations which are common to U.S. Ser. No. 07/947,023 now issued as U.S. Pat. No. 5,345,229, "Adaptive Switching Apparatus" by H. T. Olnowich etal, which is incorporated herein by reference as to all of its contents.

A typical 64×64 increasing probability network comprised of 3 stages is shown in FIG. 10, which uses the adaptive switch in two different ways. The first stage of the network uses eight 2-WAY adaptive switches denoted by blocks 151 to 158. The second stage of the network uses eight 4-WAY adaptive switches denoted by blocks 161 to 168, whereas the third stage of the network uses eight standard ALLNODE crossbar switches denoted by blocks 171 to 178. Typically switch 151 is called 2-WAY adaptive because the switch decides which of two paths to choose. The adaptive switch is asked to make a connection to only 1 of two output ports, where specific outputs of the switch can be defined as the being a different alternate paths through the network to the same destination. To illustrate this in the network shown in FIG. 10, assume NODE 1 wants to send a message to NODE 12. NODE 1 sends a message to switch 151. There are two distinct paths from switch 151 that can provide a path to NODE 12. The first path (Path A) uses Output Port 1 of switch 151 (Path A0) to connect to switch 161 from where it can take several paths to connect to switch 172 which in turn connects to NODE 12. The second path (Path B) uses Output Port 5 of switch 151 (Path B0) to connect to switch 162 from where it can take several paths to connect to switch 172 which in turn connects to NODE 12. Thus, either A or B paths can be taken from switch 151 to reach NODE 12. It is up to switch 151 to decide adaptively on which path to take based on availability. Switch 151 must take Path A0 or B0 to get to NODE 12; it can not take PATH A1, B1, A2, B2, A3, or B3, because these paths do not lead to NODE 12. Switch 151 provides 4 different paths directed at different quadrants of the network. Paths A0 and B0 lead to NODEs 1 to 16, paths A1 and B1 lead to NODEs 17 to 32, paths A2 and B2 lead to NODEs 33 to 48, and paths A3 and B3 lead to NODEs 49 to 64. Normally, the route taken through a network is defined by a binary coding of the destination node. A typical coding of 6-bits is used to define 64 destination nodes as shown by blocks 140 to 142. Different portions of this 6-bit code is applied to different stages of the network to find the desired destination NODE (12 in our example). The first two bits of the code (a0 and a1) are used at the first stage of the network to select 1 of 4 paths (Path −0, −1, 31 2, or −3) each going to a different quadrant of the network. The 6-bit code for NODE 12 is (00 1 011). The first 00 corresponding to a0 and a1 inform switch 151 to choose path −0; i.e., to choose adaptively from either Path A0 or B0. When a0 and a1 are 01, switch 151 is informed to choose adaptively from either Path A1 or B1. When a0 and a1 are 10, switch 151 is informed to choose adaptively from either Path A2 or B2. When a0 and a1 are 11, switch 151 is informed to choose adaptively from either Path A3 or B3. Thus, the destination code and the adaptive switch use their combined intelligence to find an available route to the destination NODE.

Referring to FIG. 10, typically switch 161 is called 4-WAY adaptive because the switch decides which of four paths to choose. The adaptive switch is asked to make a connection to only 1 of four output ports, where specific outputs of the switch can be defined as the being a different alternate paths through the network to the same destination. Continuing with the example, assume that NODE 1 sends a message to switch 151, and switch 151 decides to use Output Port 1 to connect over Path A0 to switch 161. At this point since switch 161 is 4-WAY adaptive, there are four distinct paths from switch 161 that can provide a path to NODE 12. The first path uses Output Port 2 of switch 61 (Path A1) to connect to switch 172 which in turn connects to NODE 12. The second path uses Output Port 4 of switch 161 (Path B1) to connect to switch 172 which in turn connects to NODE 12. The third path uses Output Port 6 of switch 161 (Path C1) to connect to switch 172 which in turn connects to NODE 12. The fourth path uses Output Port 8 of switch 161 (Path D1) to connect to switch 172 which in turn connects to NODE 12. Thus, any of the A,B,C, or D paths can be taken from switch 161 to reach NODE 12. It is up to switch 161 to decide adaptively on which path to take based on availability. Switch 161 must take a Path A1 or B1 or C1 or D1 to get to NODE 12; it can not take PATH A0, B0, C0, or D0, because these paths do not lead to NODE 12. Paths A0 to D0 lead to NODEs 1 to 8, and paths A1 to D1 lead to NODEs 9 to 16. Bit a2 of block 141 of the 6-bit destination defines to the second stage of the network (switch 161 in the example) which one of 2 paths (Path −0, −1) to select. The 6-bit code for NODE 12 is (00 1 011). The a2 bit=1 and informs switch 161 to choose path −1; i.e., to choose adaptively from Paths A1, B1, C1 or D1. When a2=0, switch 161 is informed to choose adaptively from Paths A0 to D0. Thus, the destination code and the adaptive switch use their combined intelligence to find an available route to the destination NODE.

Since the last stage of the network (switch 172 in the example) is a crossbar, it can never be blocked and does not require the capability to be adaptive. Thus, the last 3 bits of block 142 of the 6-bit destination code (bits a3, a4 and a5) are decoded directly to find the destination node. In the example, bits a3 to a5=011 which select Output Port 4 of switch 172 and connect to NODE 12.

The protocol for commanding the adaptive switch to connect an input to an output port is based on the data pattern of the 8 data lines (DATA 0 to DATA 7 from FIG. 1) arriving at each input port. The ALLNODE switch requires a unique nomenclature and decoding of the a0 and a1 bits, etc. as they are sent to each switch stage for determining which path sets (0, 1, etc.) to select. The unique ALLNODE nomenclature will be expanded here to include the adaptive switch. Consider input port 1, for instance. The data pattern to arrive first at the switch 151 input port 1, when it is idle, defines a path set of outputs to choose from based a information carried on the data lines (DATA 0 to 7). If the adaptive switch supports 2 alternate paths (like switch 151), data lines 0 to 3 are don't cares and data lines 4 to 7 define the binary decoding of the a0 and a1 bits. These DATA lines define the path set comprising 2 alternate paths (Paths A0 and B0, for instance) to choose from. If the adaptive switch supports 4 alternate paths (like switch 161), data lines 1 to 6 are don't cares and data lines 6 and 7 define the binary decoding of the a2 bit, which defines two paths sets of 4 alternate paths (Paths A1, B1, C1, or D1, for instance) to choose from. In regards to switch 151, a data pattern of (XXXX1000) on data lines 0 to 7 would define that the connection is to be made to Path −0, because DATA 5 rises and presents a logical 1 to the switch. The adaptive switch has then 2 possible outputs to try which lead to the proper destination—in this case, Paths A0 and B0 over switch 151 Output Ports 1 and 5 are the optional paths. However, the adaptive switch makes only one connection to either output port 1 or 5, but not both. Likewise, in relation to the ALLNODE switch nomenclature, the 4-WAY associative switch 161 going to NODE 12 would receive a selection data pattern of (XXXXXX01) on data lines 0 to 7. This pattern would be defined by DATA 7 rising and presenting a logical 1 to the switch. The adaptive switch 161 has then 4 possible outputs to try which lead to the proper destination—in this case, Paths A1, B1, C1 , or D1.

Referring to FIG. 11, a typical implementation of a 2-WAY adaptive switch function is shown. The logic shown is in regards to one switch input port (1) for selecting either alternate path A0 or B0 over Output Ports 1 and 5. When A0 and B0 paths are both available, one of these two alternate paths which connects to either Output 1 or 5, respectively, is preselected randomly by intelligence internal to the adaptive switch to receive the next connection command. This preselection is based on the latch comprised of NOR gates 202 and 203 which is used to determine whether to connect to Output 1 or 5 Next. Latch 202, 203 changes state to record the inverse of the last path previously selected, so that a different path will be selected on the next connection commanded to Path −0. a initialization reset provided at power-on time (POR) into gate 202 preselects latch 202, 203 to choose Path B0 (5 Next) after power is first applied to network 30 and the Power-on Reset (POR) signal is activated to initialize all logic. After the first connection is made to Output Port 5 as defined by signal 214 (Connect to 5), signal 214 drives NOR gate 203 to 0 and NOR gate 202 to 1 and causes the next Path −0 connection to be made to "1 Next".

For the example of node 1 connecting to node 12, DATA line 5 rises at the switch input port to indicate that a data pattern of (XXXX1000) is arriving and commands the adaptive switch to make a connection to either Output Port 1 or 5 (Path A0 or B0). Latches 220 and 222 record the rise of DATA 5 in regards to the busy condition of the output ports involved; i.e., if Output Port 1 is not previously busy when DATA 5 rises, it will set latch 220 indicating that a Pre-Connect to (Output Port) 1 command has been issued. Likewise, if Output Port 5 is not previously busy when DATA 5 rises, it will set latch 222 indicating that a Pre-Connect to (Output Port) 5 command has been issued. Note that latches 220 and 222 make no physical switch connections, but only record the fact that a connection command has been issued. If neither Output Port 1 or 5 is busy, both latches 220 and 222 will set simultaneously; however, the adaptive switch will only connect to 1 of the two ports based on latch 202, 203 and gates 204 to 214. If latch 220 sets and "1 Next" is also set, AND gate 206 will become active and will also activate OR gate 208 and cause a connection to be made to Output port 1. If latch 222 sets and "5 Next" is set, AND gate 210 will become active and will also activate OR gate 214 and cause a connection to be made to Output port 5. OR gates 208 and 214 are mutually exclusive and cause a connection to be made to either Output Port 1 or 5, if neither are busy. If Output Port 5 is busy as denoted by latch 222 not getting set and Output Port 1 is not busy as deneoted by latch 220 getting set, AND gate 204 is activated and causes a connection to be made to the available Output Port 1. Likewise, if Output Port 1 is busy as denoted by latch 220 not getting set and Output Port 5 is not busy as denoted by latch 222 getting set, AND gate 212 is activated and causes a connection to be made to the available Output Port 5. Thus, the adaptive switch looks for an available port from a commanded set of ports and establishes a connection to only one of them if they are both available or if either one is available. NOR gates 230 and 232 are used to determine the busy status of each output port. NOR gate 230 defines the Busy status for Output Port 1 by sensing the status of all 8 inputs ports—as to whether they are presently connected to Output Port 1 or not. If any input port has established a connection to Output Port 1, it is classified as being busy (NOR gate 230 goes to 0). In addition, any Output Port which is known to have failed, can be commanded to be permanently busy. For instance, if Output Port 1 is diagnosed to be failed, latch 224 will be permanently set by placing a 1 on DATA line 1 and pulsing the CONTROL SIGNAL to the switch. Latch 224 feeds NOR gate 30 and causes the status of Output Port 1 to always be busy. This will prevent Output Port 1 from ever being selected. Likewise, NOR gate 232 defines the Busy status for Output Port 5 by sensing the status of all 8 inputs ports—as to whether they are presently connected to Output Port 5 or not. If any input port has established a connection to Output Port 5, it is classified as being busy (NOR gate 232 goes to 0). If Output Port 5 is diagnosed to be failed, latch 226 will be permanently set by placing a 1 on DATA line 5 and pulsing the CONTROL SIGNAL to the switch. Latch 226 feeds NOR gate 32 and causes the status of Output Port 5 to always be busy. This will prevent Output Port 5 from ever being selected. Likewise, latches similar to 224 and 226 and clocked by the control strobe sampling different data lines into the switch can be used to perform other intelligent control functions, such as determining whether each individual switch should function in either the 2-WAY or 4-WAY adaptive mode.

If both Output ports 1 and 5 are busy, and a new connection is commanded, the connection is REJECTED using the REJECT interface line in the same manner as described in regards to the parent Allnode Switch.

Similar logic to that used for Output Ports 1 and 5 is used for every Output Port pair—2 and 6, 3 and 7, and 4 and 8. Also, the the logic controlling all 8 outputs is repeated 8 times—once for every input port.

Turning now to the present invention of the increasing probability network. Referring to FIG. 10, an example of a 64×64 Increasing Probability network comprised of 3 stages is shown which uses the adaptive switch in two different ways. The first stage of the network uses eight 2-WAY adaptive switches denoted by blocks 151 to 158. The second stage of the network uses eight 4-WAY adaptive switches denoted by blocks 161 to 168, whereas the third stage of the network uses eight standard ALLNODE crossbar switches denoted by blocks 171 to 178. Typically switch 151 is called 2-WAY adaptive because the switch decides which of two paths to choose. The adaptive switch is asked to make a connection to only 1 of two output ports, where specific outputs of the switch can be defined as the being a different alternate paths through the network to the same destination. To illustrate this in the network shown in FIG. 10, assume NODE 1 wants to send a message to NODE 12. NODE 1 sends a message to switch 151. There are two distinct paths from switch 151 that can provide a path to NODE 12, Path A and Path B. It is up to switch 151 to decide adaptively on which path to take based on availability.

Switch 161 is 4-WAY adaptive meaning the switch decides which of four paths to choose. The adaptive switch is asked to make a connection to only 1 of four output ports, where specific outputs of the switch can be defined as the being a different alternate paths through the network to the same destination. Since the last stage of the network is a crossbar, it can never be blocked and does not require the capability to be adaptive. The network shown in FIG. 10 has an increasing probability of success the further into the network that you progress. That is, in the first stage there the is the least probable chance for success—it has only 2 adaptive paths. The next stage has a higher probability of success because it has four adaptive paths, and the final stage has the highest probability of success because it is a non-blocking crossbar.

The network shown in FIG. 10 can be expanded to a larger networks which would still have an increasing probability of success. For a 4 stage network it would be possible to add either a stage of switch that is 2-WAY or 4-WAY adaptive to the 3 stages shown if FIG. 10 which would yield a network to interconnect 128 or 256 nodes, respectively. The solutions are as follows:

```
Stage 1 - 2-Way Adaptive
Stage 2 - 2-Way Adaptive      Interconnects 128 Nodes
Stage 3 - 4-Way Adaptive
Stage 4 - Crossbar
OR
Stage 1 - 2-Way Adaptive
Stage 2 - 4-Way Adaptive      Interconnects 256 Nodes
Stage 3 - 4-Way Adaptive
Stage 4 - Crossbar
```

Likewise, the network shown in FIG. 10 can be expanded to a 5 stage network. The solutions are as follows:

```
Stage 1 - 2-Way Adaptive
Stage 2 - 2-Way Adaptive      Interconnects 512 Nodes
Stage 3 - 4-Way Adaptive
Stage 4 - 4-Way Adaptive
Stage 5 - Crossbar
OR
Stage 1 - 2-Way Adaptive
Stage 2 - 4-Way Adaptive      Interconnects 1024 Nodes
Stage 3 - 4-Way Adaptive
Stage 4 - 4-Way Adaptive
Stage 5 - Crossbar
```

In a similar manner unlimited cascading can occur.

Figures 12, 12A:
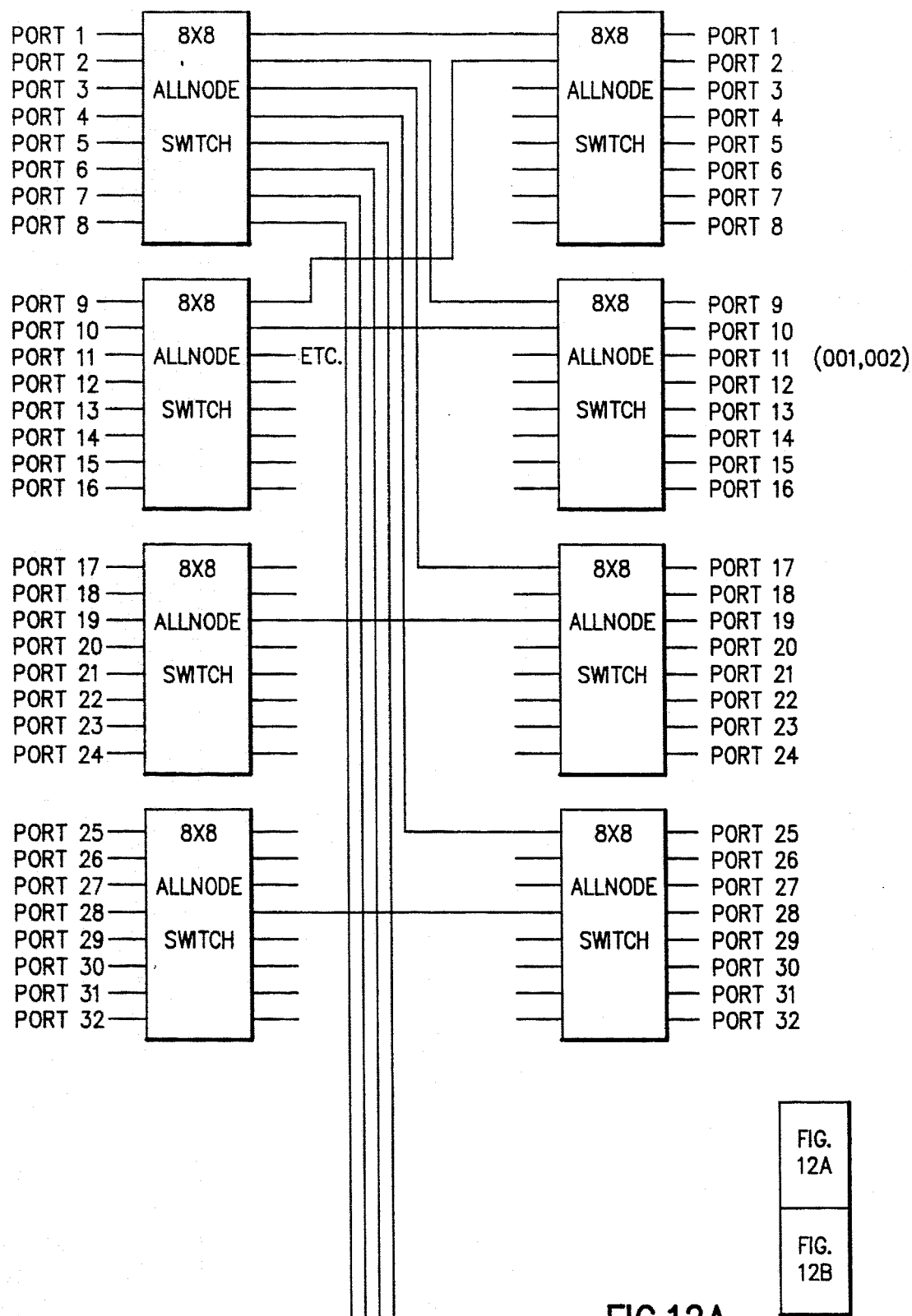
FIG. 12 illustrates an alternative multi-stage increasing probability network implemented using multiple copies of the adaptive switching apparatus to interconnect 32 nodes.
Figure 12B:
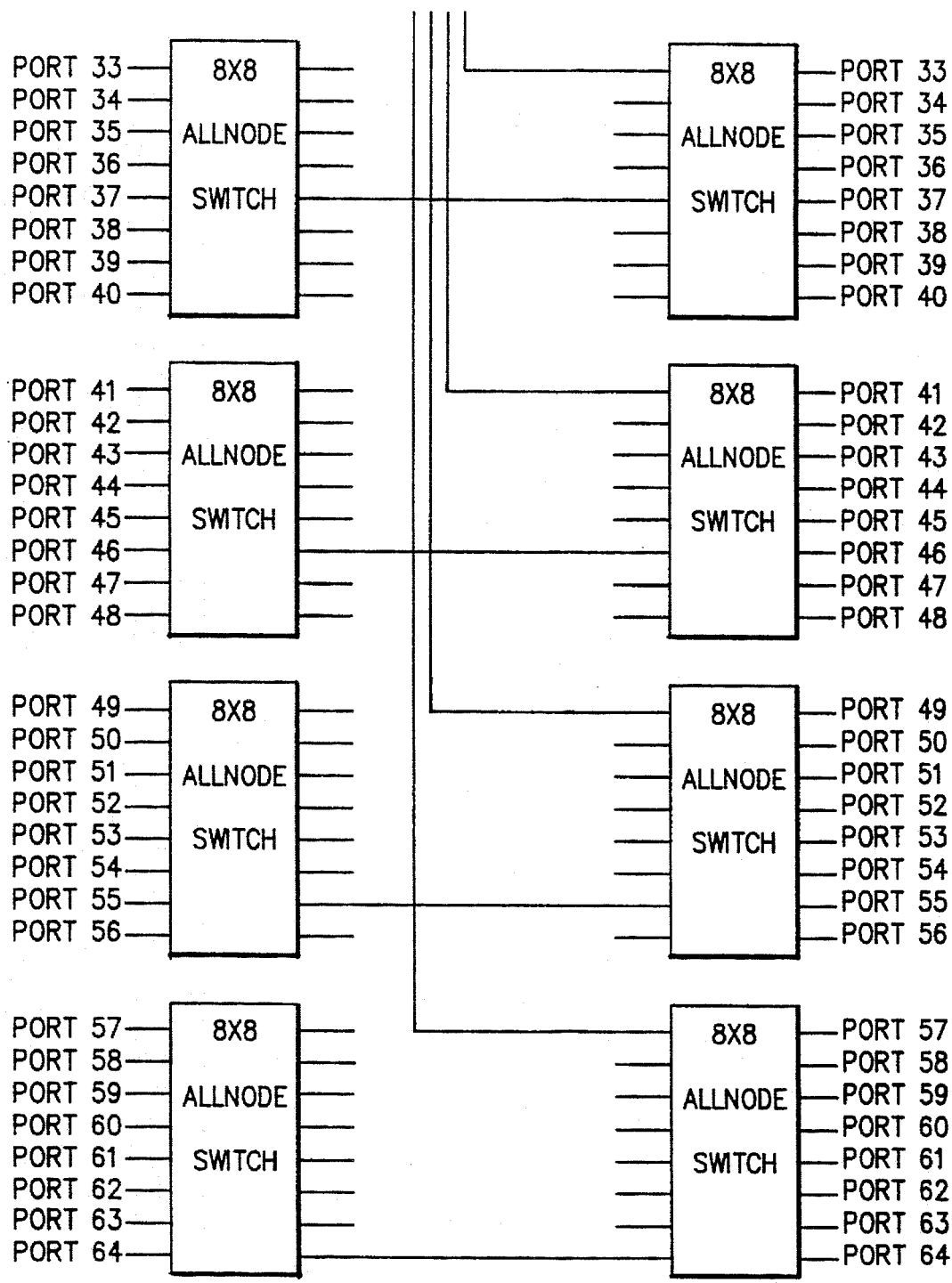
Figure 13B:
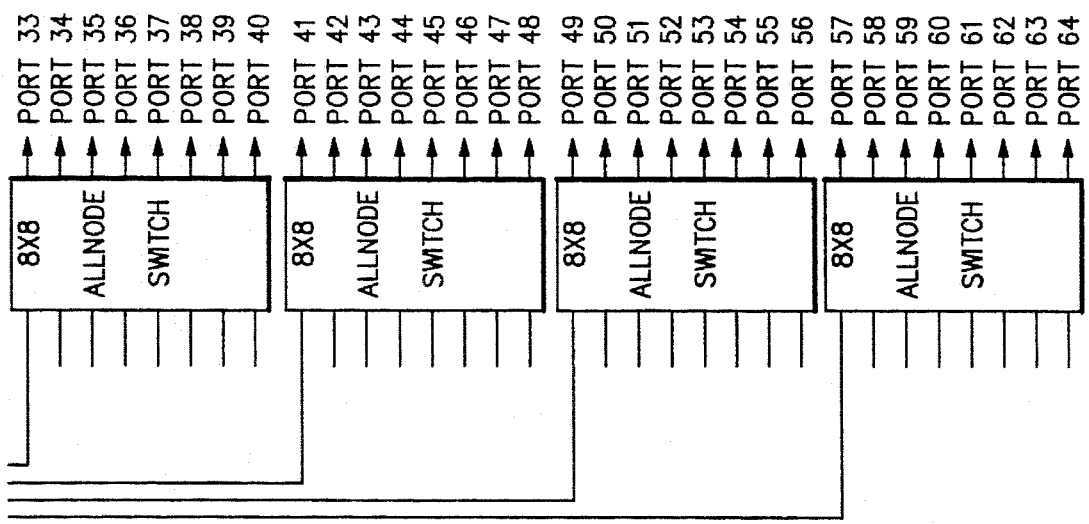
FIG. 13 illustrates a three stage configuration of the 8×8 Allnode switch using alternate paths.
Figure 13B:
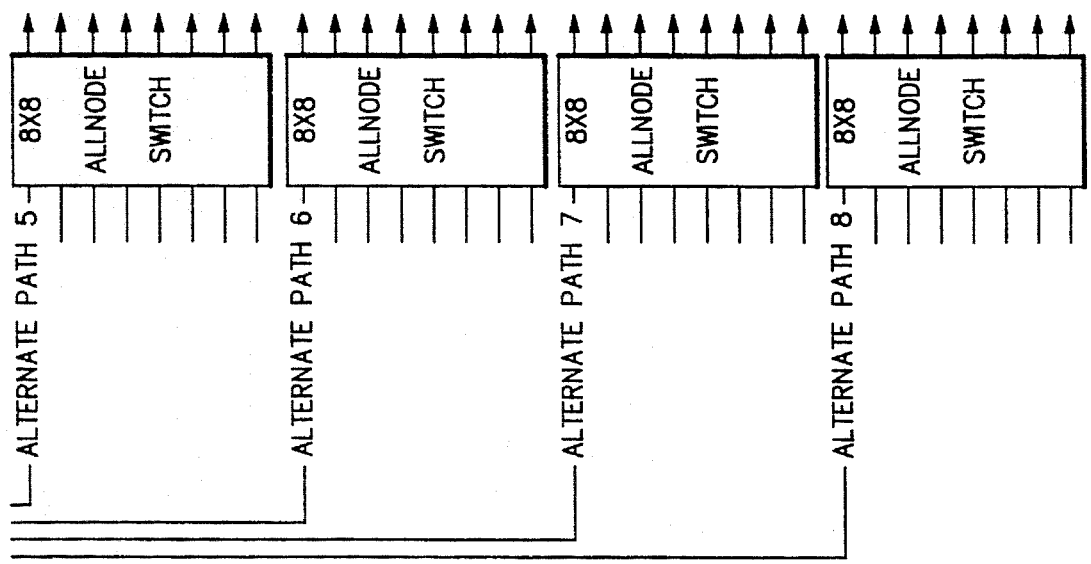
Figure 13B:
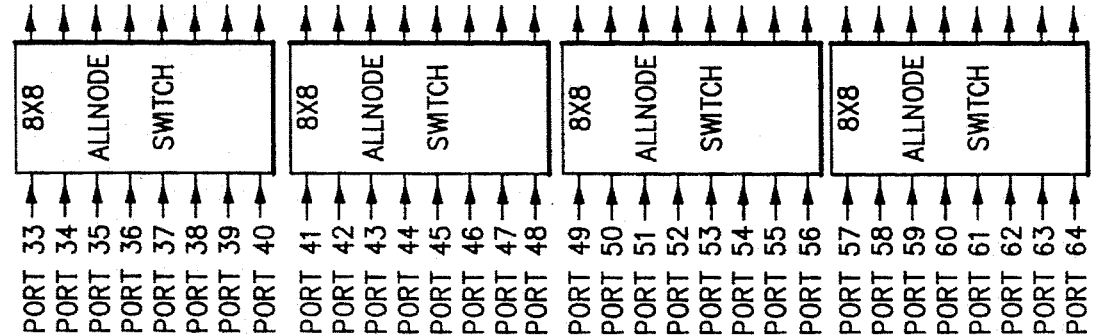
Figure 14A:
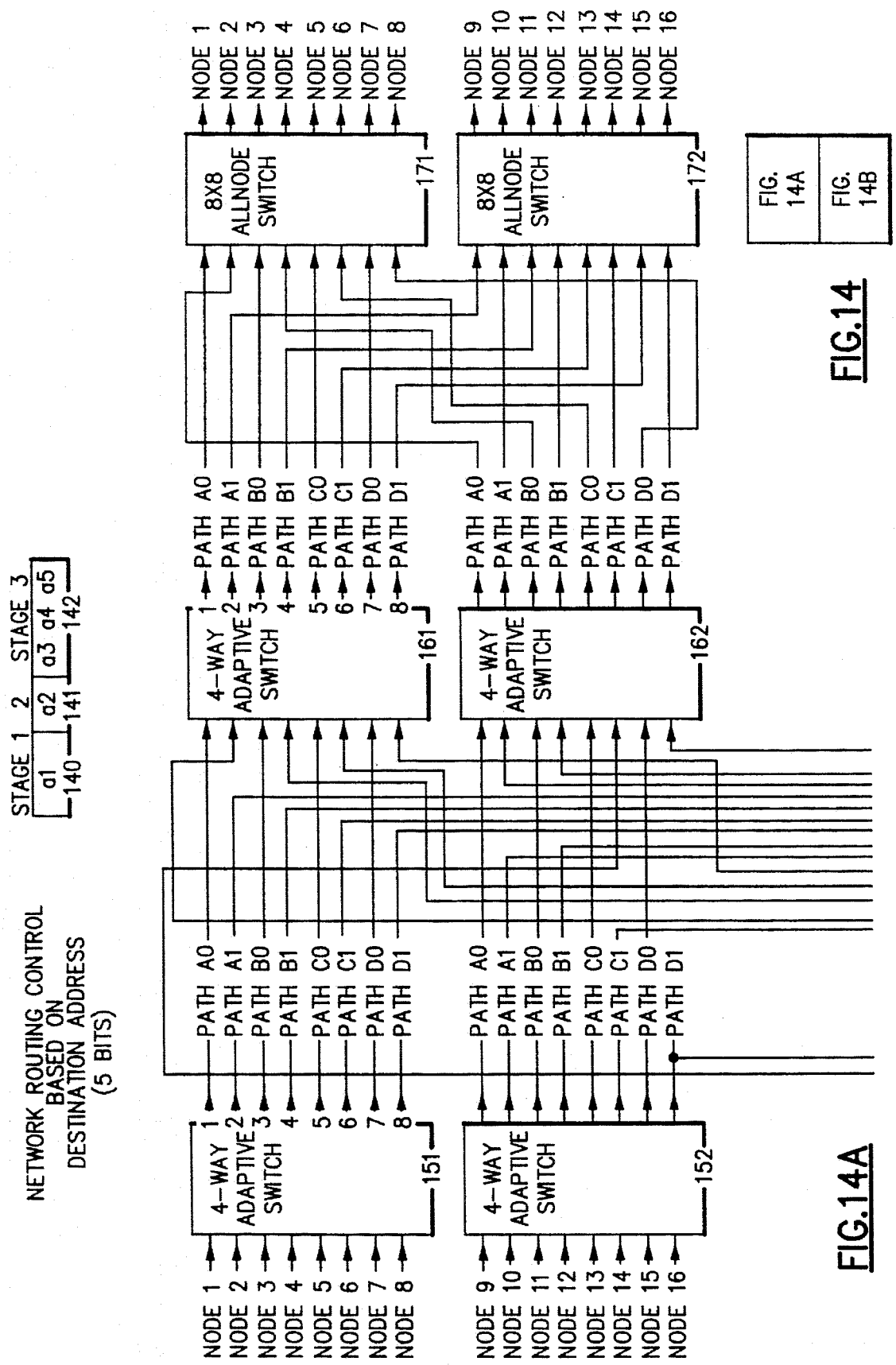
FIG. 14 illustrates a three stage configuration implementing the 4-way adaptive switch in the first two stages and the 8×8 Allnode switch in the last stage.
Figure 14B:
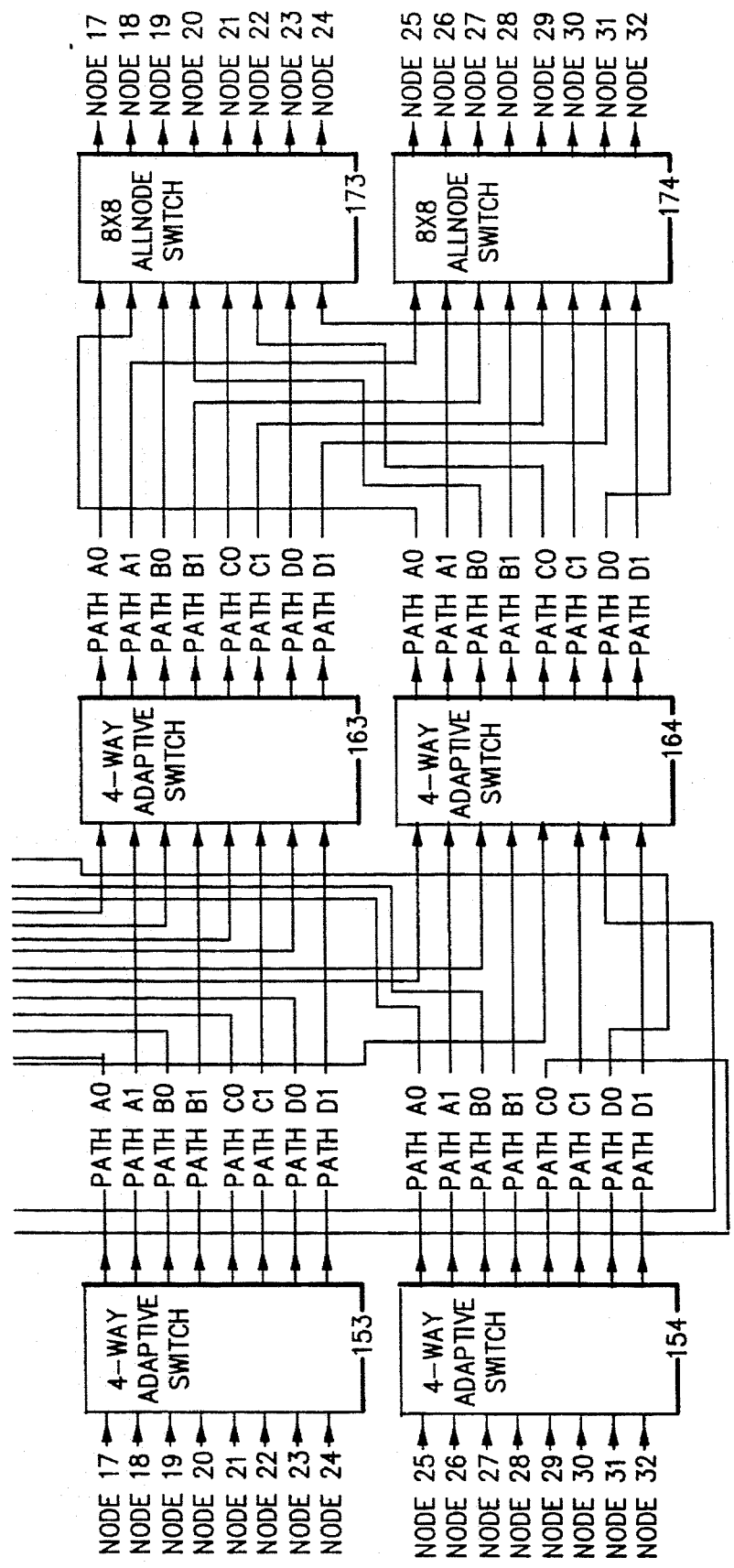

Another alternative to the network shown in FIG. 10 would be to use use a 4-WAY switch in the first stage. This would reduce the number of nodes interconnected by the network. For instance, consider a standard Omega network of size 64×64 comprised of 8×8 switch chips as shown in FIG. 12. When using two stages of switch it is possible to interconnect 64 nodes with 1 and only one path through the network between any two nodes. By adding a third stage to the network, it than becomes possible to have 8 alternate paths between any two nodes as shown in FIG. 13, since an 8-ported switch stage has been added. These 8 alternate paths can be used in two ways: the 8 paths can be concentrated all in one stage as shown in FIG. 13, or they can be spread out over two stages as shown in FIG. 10, assigning 2 alternate paths to one stage and 4 to another stage (these multiply—2×4 still gives 8 alternate paths). Our example of an increasing probability network assigns the 8 paths as 2 alternates to stage 1 and 4 alternates to stage 2. The opposite assignment would be 4 alternates to stage 1 and 2 alternates to stage 2; this would produce a decreasing probability network. Assigning the 4 alternates to stage 1 and 4 alternates to stage 2 would result in a total of 16 alternate paths in 3 stages of network as shown in FIG. 14. This type of network could not support 64 nodes, instead the increase in alternate paths by a factor of 2 would result in a corresponding decrease in nodes by a factor of two. In other words, a network comprised of 16 alternate paths in 3 stages would be capable of only supporting 32 nodes, not 64 nodes as shown by FIG. 14.

Clearly, the inventions which we have described by way of example and in illustration of our best mode of practicing the inventions in the various embodiments described provide a basis for much potential growth. Accordingly, it will be understood that those skilled in the art, both now and in the future, will envision further improvements even by way of invention, and these should be understood to be within the claimed scope which should be construed to protect and preserve the rights of the inventors.

What is claimed is:

1. A multi-stage bufferless switch network comprising:

a final stage;

initial stages;

said initial stages comprising:

a plurality of selectable switch apparatuses operably coupled in a cascaded manner to include at least a first selectable switch apparatus and a last selectable switch, each of the plurality of selectable switch apparatuses including a plurality of switch inputs and a plurality of switch outputs, each of the plurality of switch outputs of each of the plurality of selectable switch apparatuses, except for the plurality of switch outputs of the last selectable switch apparatus, is coupled to a corresponding one of the plurality of switch inputs of another one of the plurality of selectable switch apparatuses;

the final stage comprising:

a plurality of crossbar switch apparatuses each of which includes a plurality of crossbar switch inputs and a plurality of crossbar switch outputs, each one of the plurality of switch outputs of the last selectable switch apparatus coupled to a corresponding one of the plurality of crossbar switch inputs, the plurality of crossbar switch outputs comprising network output ports and the plurality of switch inputs of the first selectable switch apparatus comprising network input ports;

a plurality of nodes each coupled to one of the network output ports and to one of the network input ports, each of said nodes comprising means for receiving a data message from a coupled network output port and means for sending a data message to a coupled network input port, said data message including a path connection request;

said selectable and crossbar switch apparatuses each including:

connection means for establishing one communication path between any one of the network input ports and any one of the network output ports in response to said path connection request received at said coupled network input port, said communication path for transmitting a data message received at said any one of the network input ports to said any one of the network output ports; and said connection means including asynchronous connection means for establishing asynchronously a plurality of simultaneously active communication paths between a plurality of the network input ports and a plurality of the network output ports in response to a plurality of connection requests received separately or simultaneously at said plurality of the network input ports, said simultaneously active communication paths for transmitting a plurality of data messages received separately or simultaneously at said plurality of the network input ports to said plurality of the network output ports; and said plurality of selectable switch apparatuses each further including:

a plurality of alternative switch outputs selectable by the connection means in response to a connection request for establishing said one communication path arriving at one of the plurality of switch inputs of one of the plurality of selectable switch apparatuses, the connection means selecting one of the plurality of alternative switch outputs for establishing said one communication path.

2. The network according to claim 1, wherein the selectable switch apparatuses each further include means coupled to each one of the plurality of switch outputs and switch inputs for sending back to a sending node a reject signal if all of the alternative switch outputs of a selectable switch apparatus selectable by the connection means for establishing said one communication path are in use.

3. The network according to claim 1, wherein the selectable switch apparatuses each further include latch means coupled to each switch input for permanently preventing one or more of the alternative switch outputs selectable by the connection means from being selected by the connection means.

4. The network according to claim 1, wherein the selectable switch apparatuses each comprise an equal number of alternative switch outputs selectable by the connection means in response to a connection request for establishing said one communication path arriving at a switch input of the selectable switch apparatus.

* * * * *